(12) United States Patent
Himsoon et al.

(10) Patent No.: US 8,374,291 B1
(45) Date of Patent: Feb. 12, 2013

(54) METHODS FOR BIT SYNCHRONIZATION AND SYMBOL DETECTION IN MULTIPLE-CHANNEL RADIOS AND MULTIPLE-CHANNEL RADIOS UTILIZING THE SAME

(75) Inventors: Thanongsak Himsoon, Kent, WA (US); Wipawee Siriwongpairat, Kent, WA (US)

(73) Assignee: MeteorComm LLC, Kent, WA (US)

( * ) Notice: Subject to any disclaimer, the term of this patent is extended or adjusted under 35 U.S.C. 154(b) by 570 days.

(21) Appl. No.: 12/658,136

(22) Filed: Feb. 3, 2010

Related U.S. Application Data

(60) Provisional application No. 61/206,744, filed on Feb. 4, 2009.

(51) Int. Cl.
*H03D 1/00* (2006.01)
*H04L 27/06* (2006.01)

(52) U.S. Cl. ......................... 375/343; 375/340
(58) Field of Classification Search .................... 375/343
See application file for complete search history.

(56) References Cited

U.S. PATENT DOCUMENTS

| | | | |
|---|---|---|---|
| 5,017,883 A | 5/1991 | Divsalar et al. | |
| 5,870,443 A | 2/1999 | Rahnema | |
| 7,039,132 B1 * | 5/2006 | Chen et al. | 375/334 |
| 2003/0026201 A1 * | 2/2003 | Arnesen | 370/210 |
| 2005/0084028 A1 * | 4/2005 | Yu et al. | 375/267 |
| 2006/0116095 A1 * | 6/2006 | Henriksson | 455/223 |
| 2007/0268976 A1 * | 11/2007 | Brink et al. | 375/260 |
| 2009/0006084 A1 * | 1/2009 | Chen | 704/211 |

OTHER PUBLICATIONS

R. Mehlan et al., A Fully Digital Feedforward MSK Demodulator with Joint Frequency . . . , IEEE Transactions on Vehicular Technology, Nov. 1993, pp. 434-443, vol. 42, No. 4.

A. Abrardo et al., Multiple-Symbol Differential Detection of GMSK . . . , IEEE Transactions on Vehicular Technology, Aug. 1995, pp. 379-389, vol. 44, No. 3.

\* cited by examiner

*Primary Examiner* — Erin File
(74) *Attorney, Agent, or Firm* — Thompson & Knight LLP; James J. Murphy

(57) ABSTRACT

A radio receiver including a memory storing a reference sample sequence and a synchronizer. The synchronizer receives a data packet, samples and modulates symbols from the data packet and then generates phase-information samples from the modulated samples. The phase-information samples are low-pass to generate a filtered phase-information sample sequence. Samples of the filtered phase-information sample sequence are selectively compared with samples of the reference sample sequence and bit synchronization is established when a selected number of samples of the filtered phase-information sample sequence match a selected number of samples of the reference sample sequence.

31 Claims, 12 Drawing Sheets

METHODS FOR BIT SYNCHRONIZATION AND SYMBOL DETECTION IN MULTIPLE-CHANNEL RADIOS AND MULTIPLE-CHANNEL RADIOS UTILIZING THE SAME

CROSS-REFERENCE TO RELATED APPLICATION

The present application claims the benefit of U.S. Provisional Patent Application Ser. No. 61/206,744, filed Feb. 4, 2009.

FIELD OF INVENTION

The present invention relates in general to wireless communications techniques, and in particular to methods for bit synchronization and symbol detection in multiple-channel radios and multiple-channel radios using the same.

BACKGROUND OF INVENTION

In any transportation industry, reliable communications systems are mandatory for avoiding serious, if not catastrophic, accidents. In the particular case of the railroads, the railroad central offices normally communicate through wired telecommunications links with a network of radio base stations, which are typically dispersed over very large geographical areas. The radio base stations in turn maintain wireless communication links with locomotives, service vehicles, and wayside systems operating within the base station coverage areas.

In designing and operating a communications system for a transportation industry, a number of different constraints must be addressed. In the railroad industry, for example, a reliable and efficient communications system must be capable of handling different types of information, including data transmitted from the railroad central office and wayside systems to the locomotive on-board computers, as well as voice transmissions between train crews and the central office. In addition, any wireless communications system must conform with the restrictions imposed on it by the Federal Communications Commission (FCC), for example, those related to frequency band allocation, channel width and spacing, and so on. Finally, any commercially viable communications system should be adaptable to meet new needs and challenges as they arise.

SUMMARY OF INVENTION

The principles of the present invention are embodied in bit synchronizers for use in radios, and in particular multiple-channel software defined radios. According to one exemplary embodiment, a radio receiver is disclosed that includes a memory storing a reference sample sequence and a synchronizer. The synchronizer receives a data packet, samples and modulates symbols from the data packet, and then generates phase-information samples from the modulated samples. The phase-information samples are low-pass filtered to generate a filtered phase-information sample sequence. Samples of the filtered phase-information sample sequence are selectively compared with samples of the reference sample sequence and bit synchronization is established when a selected number of samples of the filtered phase-information sample sequence match a selected number of samples of the reference sample sequence.

Sequence correlation-based synchronization according the principles of the present invention realizes a number of significant advantages. Among other things, embodiments of the present principles can advantageously be used with signals generated with different modulation schemes, in different frequency bands, and/or under different communications protocols. Additionally, synchronization can be established for data packets using either a bit synchronization pattern, a frame synchronization pattern, or both. This allows a radio receiver that misses the beginning part of a data packet, which contains the bit sync pattern, to synchronize and receive the latter part of the data packet. Furthermore, both the symbol timing and frequency offset error are jointly established in a single process.

The principles of the present invention are also embodied in symbol detectors for use in radios, and in particular, to decision-feedback multiple-symbol detectors. In one representative embodiment, a method of symbol detection in a radio receiver is disclosed, which includes updating a received vector with a received sequence of data samples, setting the elements of the received vector to the first sample in the received sequence of data samples, and selecting a set of correlation vectors in response to a feedback vector, with each correlation vector corresponding to a symbol. The received vector is compared with each correlation vector in the selected set of correlation vectors to generate a set of correlation values. The symbol corresponding to the correlation vector with the highest correlation value is then taken as the detected symbol.

Advantageously, embodiments of the present decision-feedback multiple-symbol (DFMS) detection principles are applicable to both the constant envelope modulations and linear modulations. Additionally, these DFMS detection principles allow for the detection of symbols despite inter-symbol interference and fading. Furthermore, the processing operations required to implement these DFMS detectors are mostly additions and table look-ups, which achieves low implementation complexity.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-13 of the drawings, in which like numbers designate like parts.

Figure 1:
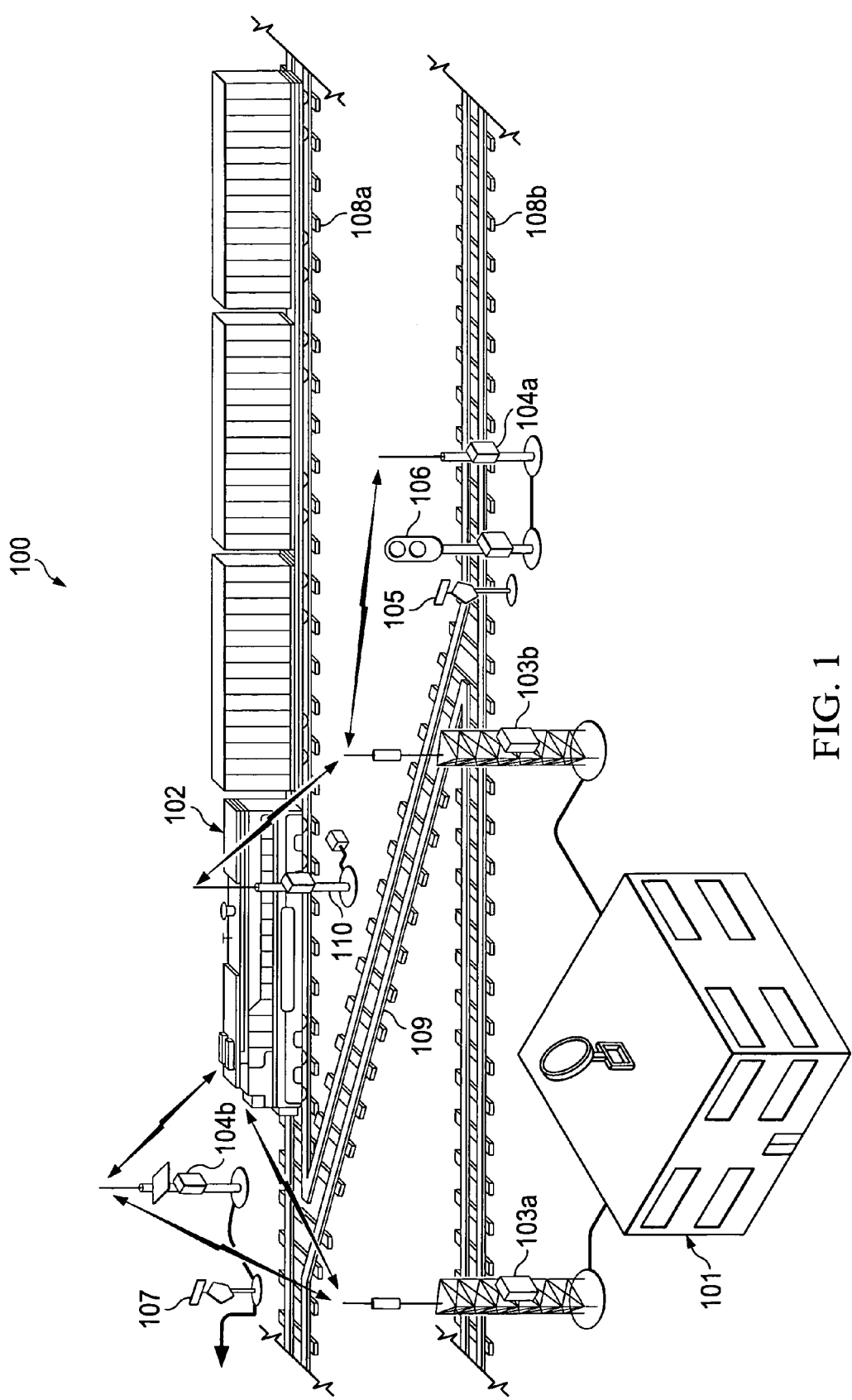
FIG. 1 is a high level block diagram of a small portion of a representative communications system utilized in the railroad industry and suitable for describing a typical application of the present inventive principles.

FIG. 1 is high level diagram showing a small portion of a railroad communications system 100 embodying the principles of the present invention. Generally, system 100 supports wireless communications between a central office (network operating center) 101 and locomotives 102 located at various points around a rail system, as well as direct communications between locomotives 102 and the electronic wayside monitoring subsystems, discussed below in detail.

In communications system 100, central office 101 communicates with packet data radios on locomotives 102 through a wired telecommunications network and a series of packet radio base stations dispersed over thousands of square miles of geographical area through which the rail system operates. In the diagram of FIG. 1, two radio base stations 103*a* and 103*b* are shown for discussion purposes.

Communications system 100 also includes a series of wayside monitoring subsystems, which monitor wayside systems such as signals, switches, and track circuits and communicate the monitored information directly to locomotives 102 within the corresponding wireless coverage area, as well as to central office 101 though base stations 103. FIG. 1 shows two representative wayside monitoring subsystems 104*a* and 104*b*. As examples of typical uses of wayside monitoring subsystems 104, wayside monitoring subsystem 104*a* is shown monitoring a switch 105 and a signal 106, and wayside monitoring subsystem 104*b* is shown monitoring a hand-throw switch 107. Also for illustrative purposes, two parallel sections of track 108*a* and 108*b* and a connecting section 109 are shown in FIG. 1, which represent only a very small part of the overall track system.

Communications system 100 also includes a hotbox monitoring subsystem 110 which uses rail-side sensors to allow central office 101 to monitor the axle status of passing trains through packet data radios and wireless base stations 103. In particular, railcar wheels, brakes, and trucks can be monitored for stuck brakes or overheated bearings, such that trains can be slowed or stopped before a catastrophic failure occurs.

Generally, the communications paths between central office 101 and locomotives 102 allow for the exchange of locomotive location reports, the transmission of locomotive health and diagnostic data, transmission of movement authorities, file transfers, information downloads, and the exchange of network management data. Additionally, central office 101 communicates with other railroad vehicles (non-locomotive), such that information such as vehicle location, work reporting, email, and material requisitions can be exchanged.

The communications paths between wayside monitoring subsystems 104 and central office 101 support, for example, signal system health and status monitoring, centralized control of control points, and wayside defect detector system data and alarms. The communications paths between locomotives 102 and wayside monitoring subsystems 104 allow locomotives 102 in the proximity of a given wayside to receive wayside status updates. Finally, the communications paths between mobile remotes and mobile remotes (e.g. locomotives 102, non-locomotive vehicles) support peer-to-peer proximity position reports so that a mobile is aware of the locations of nearby mobiles.

The multi-channel capability of a software defined radio (SDR), provides several advantages, particularly in railroad applications. Among other things, with multi-channel capability, a locomotive 102 can receive information from a base station 103 and a wayside monitoring subsystem 104 simultaneously. Additionally, locomotives 102 and base stations 103 can receive status messages from multiple wayside monitoring subsystems 104 simultaneously. This in turn provides the ability to support a high density of waysides in city areas, which is highly desirable in train control systems (i.e. positive train control systems).

Figure 2A:
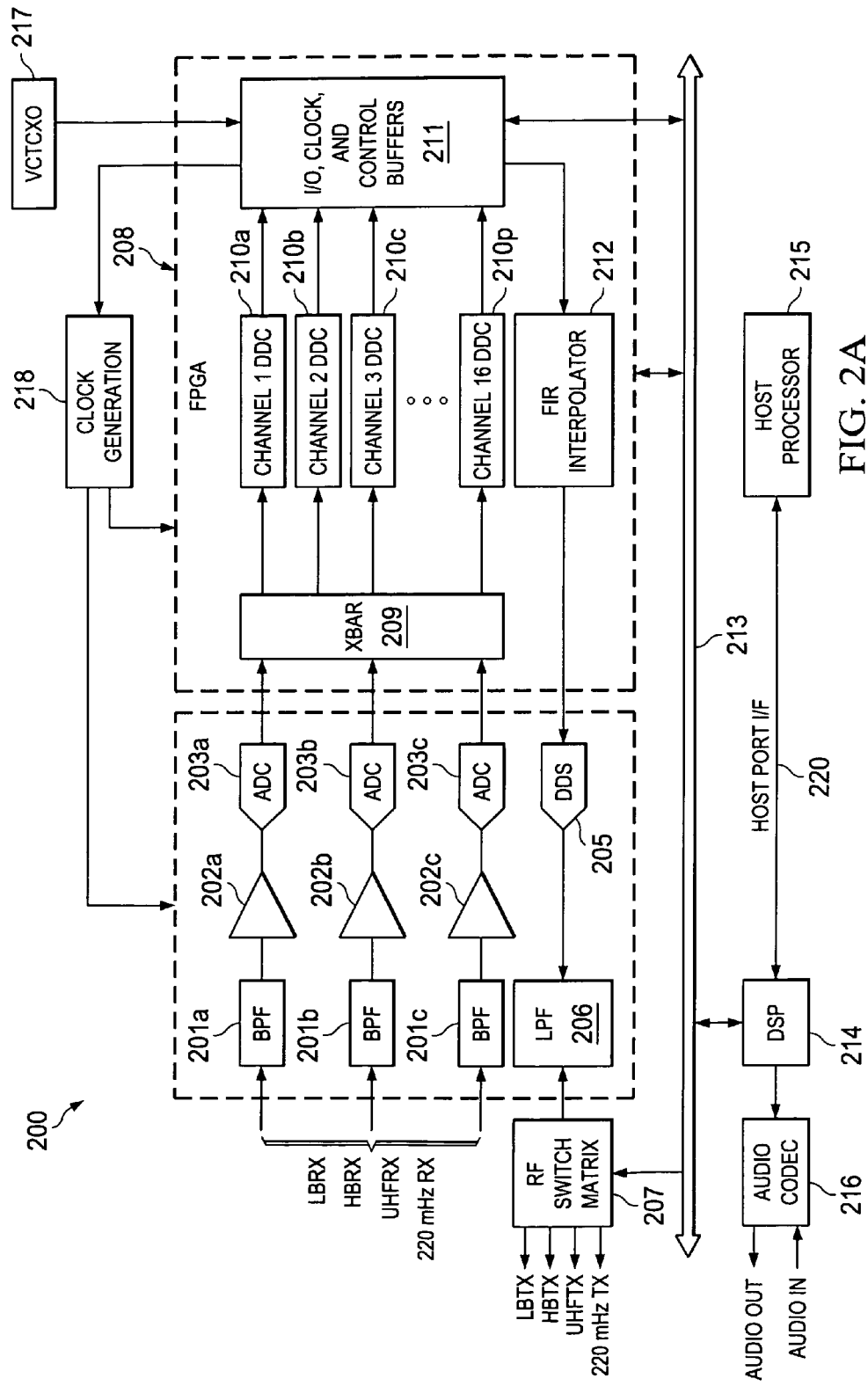
FIG. 2A is a block diagram of the primary operational blocks of a representative software defined radio (SDR) embodying the principles of the present invention.

FIG. 2A is a block diagram of a multiple-channel software defined radio (SDR) embodying the principles of the present invention. Among other things, SDR 200 realizes the significant advantage of allowing multiple information (voice and data) channels to be simultaneously received on multiple radio frequency (RF) input bands and then simultaneously demodulated using multiple parallel data processing paths. Particularly advantageous is the fact that these data channels can have different frequencies, channel spacing, modulation types, and bit rates. In other words, SDR 200 performs multiple simultaneous receive operations typically requiring a corresponding number of single-channel receivers. Furthermore, SDR 200 also supports simplex data transmission on a selected transmission channel and RF frequency band.

SDR 200 is suitable for use in a wide range of radio communications applications requiring the simultaneous or near simultaneous exchange of multiple channels of information in multiple formats, such as digital data and voice. In exemplary system 100 of FIG. 1, SDR radio 200 may be used in base stations 103, locomotives 102, and wayside monitoring subsystems 104.

Various communications protocols have been used to support data communications in railroad communications systems. These include a protocol for Interoperable Train Control communications (ITCNET), MBNET, which is a communication protocol for extended line of sight communications, Advanced Train Control Systems (ATCS), which specifies a communication protocol for railroad operations, Higher Performance Data Radio (HPDR), which is a wireless communication protocol for railroad communication that supports integration of voice and data transmission, and voice protocols. ITCNET operates in the 220 MHz band; MBNET operates on a single frequency in three bands: low band VHF, high band VHF, and UHF; ATCS operates in the 900 MHz UHF band and HPDR operates in the 160 MHz band. For railroad communications, analog voice is typically 12.5 kHz data and digital voice is typically 6.25 kHz data.

The illustrated embodiment of SDR 200 operates under any of the ITCNET, MBNET, ATCS, or HPDR protocols, and supports 12.5 kHz analog and 6.25 digital voice, as well. Consequently, SDR 200 transmits and receives data on four (4) RF frequency bands. In the preferred embodiment, the receive bands include low band VHF (39-50 MHz), high band VHF (151-163 MHz), the 220 MHz band (217-222 MHz), and the UHF band (935-940 MHz). The transmit bands include low band VHF (39-50 MHz), high band VHF (151-163 MHz), the 220 MHz band (217-222 MHz), and the UHF band (935-940 MHz).

In order to meet the requirements of the various communications protocols, SDR 200 supports multiple both linear and constant envelope modulation waveforms. Examples of supported linearly modulated signals include DQPSK and π/4 DQPSK signals. Examples of supported constant envelope modulation signals include 4FM, SOQPSK, GMSK, and GFSK signals. These modulation techniques, which are well known in the art, but generally be described as follows.

Differential Quadrature Phase Shift Keying (DQPSK) is a linear modulation waveform that relies on the difference between successive phases of a signal rather than the absolute phase position. DQPSK modulation uses 2 bits per symbol and a symbol rate of half the bit rate. A variation of DQPSK waveform, called π/4 DQPSK waveform, is a DQPSK waveform with phase transitions rotated by 45°. The π/4 DQPSK waveform, as used in the ITCNET protocol, utilizes a root raised cosine (RRC) pulse shaping filter with the roll-off factor of 0.35. The waveform provides a channel bit rate of 32 kbps in the 25 kHz channel under emission mask 5×F, and a bit rate of 16 kbps in the 12.5 kHz channel under the same emission mask.

4-Level Frequency Modulation (4FM) is a type of constant envelope and continuous phase modulation that carries the information in the frequency of the signal. In particular, in 4FM signaling the carrier is shifted in frequency at a particular rate to a particular location around a center frequency. This allows for each of the 4 states to represent a binary number, with each state representing a symbol that contains two bits of information. The symbol rate of 4FM signal is half the bit rate. The 4FM waveform is used in the ITCNET and HPDR protocols, using an RRC pulse shaping filter having a roll-off factor of 0.35 for both protocols. The 4FM waveform provides a bit rate of 16 kbps in the 25 kHz channel under emission mask 5×F for the ITCNET protocol, and a bit rate of 24 kbps in the 25 kHz channel under emission mask D for the HPDR protocol.

Shaped-Offset Quadrature Phase Shift Keying (SOQPSK) is a type of constant envelope and continuous phase modulation technique based on a constrained ternary data alphabet. There are two versions of SOQPSK that are widely used, specifically, the military-standard version, SOQPSK-MIL, and the one adopted in the telemetry group, SOQPSK-TG. The SOQPSK-MIL version uses a rectangular pulse shaping filter that spans a single bit time, which gives a full response. The SOQPSK-TG version has a pulse shaping filter that spans eight bit times, which gives a partial response. In the ITCNET protocol, the waveform is based on a SOQPSK-TG pulse, which provides a bit rate of 16 kbps in the 25 kHz channel under emission mask 5×F.

Gaussian Minimum Shift Keying (GMSK) uses a constant envelope and continuous phase modulation to carry information in the frequency of the signal. Specifically, the GMSK waveform is a continuous-phase frequency-shift keying modulation scheme with a Gaussian pulse shaping filter and a frequency separation of one-half the bit rate (i.e., the frequency shift is such that over a bit period the phase of the carrier changes by 90 degrees). A shift of half the bit rate corresponds to the modulation index of 0.5. The symbol rate of a GMSK signal is the same as the bit rate.

The GMSK waveform is used in the MBNET and HPDR protocols and supports various bit rates by allowing an adjustment of the bandwidth-time product (BT) of the Gaussian pulse shaping filter. In the MBNET protocol, the GMSK waveform provides bit rates of 9.6 kbps at BT=1 and 19.2 kbps at BT=0.22 in a 25 kHz channel under emission mask C. The GMSK waveform also provides a bit rate of 9.6 kbps in a 12.5 kHz channel at BT=0.28 under emission mask D and BT=0.33 under emission mask J. In the HPDR protocol, the GMSK waveform provides a bit rate of 9.6 kbps at BT=0.3 in 25 kHz channel under emission mask C.

Gaussian Frequency Shift Keying (GFSK) utilizes constant envelope modulation and carries information in the frequency of the signal. More particularly, GFSK is a Frequency Shift Keying modulation technique that uses a Gaussian for pulse shaping to smooth positive/negative frequency deviations, which represent a binary 1 or 0. While GMSK modulation has an exact frequency shift of half the bit rate, there is no limit on the exact shift for the GFSK modulation. The modulation index of a GFSK signal can thus be any value between 0 and 1, while the modulation index of a GMSK signal is always 0.5. The symbol rate of a GFSK signal is the same as the bit rate.

The GFSK waveform is used in the ATCS protocol. In the ATCS protocol, a Gaussian filter with BT=0.5 is used as the pulse shaping filter and the waveform provides a bit rate of 4.8 kbps in a 12.5 kHz channel under emission mask J. The frequency deviation is 1.7 kHz, which results in the modulation index of 0.7.

Table 1 lists the waveforms, frequency bands, and bit rates that are supported by the illustrated embodiment of SDR 200. As discussed above, with multi-channel capability, SDR 200 can operate on different frequency bands with different protocols simultaneously. For example, SDR 200 could listen to an analog voice channel at 160 MHZ while at the same time receiving and/or transmitting data on a low band channel (39-50 MHZ) via the MBNET protocol or on a 900 MHz channel via the ATCS protocol without interference.

TABLE 1

| Freq Band (MHz) | Protocol | Waveform | Pulse Shaping Filter | Bit Rate (kbps) | Channel BW (kHz) | Emission Mask |
|---|---|---|---|---|---|---|
| 39-50 | MBNET | GMSK | Gaussian with BT 1.0 | 9.6 | 25 | C |
| 39-50 | MBNET | GMSK | Gaussian with BT 0.22 | 19.2 | 25 | C |
| 151-162 | MBNET | GMSK | Gaussian with BT 1.0 | 9.6 | 25 | C |
| 151-162 | MBNET | GMSK | Gaussian with BT 0.22 | 19.2 | 25 | C |
| 151-162 | MBNET | GMSK | Gaussian with BT 0.28 | 9.6 | 12.5 | D |
| 151-162 | HPDR | GMSK | Gaussian with BT 0.3 | 9.6 | 25 | C |
| 151-162 | HPDR | 4FM | RRC with roll-off 0.35 | 24 | 25 | C |
| 217-222 | ITCNET | 4FM | RRC with roll-off 0.35 | 16 | 25 | 5 × F |
| 217-222 | ITCNET | DQPSK | RRC with roll-off 0.35 | 32 | 25 | 5 × F |

TABLE 1-continued

| Freq Band (MHz) | Protocol | Waveform | Pulse Shaping Filter | Bit Rate (kbps) | Channel BW (kHz) | Emission Mask |
|---|---|---|---|---|---|---|
| 217-222 | ITCNET | DQPSK | RRC with roll-off 0.35 | 16 | 12.5 | 2.5 × F |
| 217-222 | ITCNET | SOQPSK | SOQPSK-TG | 16 | 25 | 5 × F |
| 896-901/ 935-940 | ATCS | GFSK | Gaussian with BT 0.5 | 4.8 | 12.5 | J |
| 896-901/ 935-940 | MBNET | GMSK | Gaussian with BT 0.33 | 9.6 | 12.5 | J |

As shown in FIG. 2A, the receive bands (LBRX, HBRX, UHFRX, 220 MHz) are provided with three (3) independent hardware paths including an analog bandpass filter (BPF) 201a-201c, an intermediate frequency (IF) amplifier 202a-202c, and an analog to digital converter (ADC) 203a-203c. In the illustrated embodiment, BPFs 201a-201c have a passband of approximately 39-90 MHz, IF amplifiers 202a-202c provide approximately 21 dB of gain with bypass, and ADCs 203a-203c operate at a sampling rate of 57.6 Msps and have an output resolution of fourteen (14) bits. (Front end modules [not shown] perform low-noise amplification and down-convert signals received on the HBRX and the UHFRX bands into the 39-90 MHz IF bands at the inputs to BPFs 201b and 201c). Filters 201a-201c reduce spurious noise generated elsewhere in the system and suppress energy that would otherwise be sampled outside the first two (2) Nyquist zones. IF amplifiers 202a-202c improve the noise figure at the inputs to ADCs 203a-203c. The particular receive hardware parameters may change based on the specific design and application of SDR 200.

The RF transmit path includes a direct data synthesizer (DDS) 204, which performs digital sinusoidal carrier frequency generation and digital to analog conversion, and an analog lowpass filter (LPF) 206. In the illustrated embodiment, LPF 206 has a corner frequency of approximately 90 MHz and passes signals in the 39-90 MHz IF band to an RF switch matrix 207. RF switch matrix 207 switches the IF signals to corresponding transmit modules (not shown), which generate the ultimate RF signals within the appropriate RF transmit band (LBTX, HBTX, UHFTX, or 220 MHz).

According to the principles of the present invention, SDR 200 is based upon a field programmable gate array (FPGA) 208, which may be, for example, an Altera EP2C35 FPGA. Generally, FPGA 208 and accompanying firmware act as a multi-channel receiver tuner and transmit modulator interpolator. FPGA 208 implements, for example, signal routing, channel turning, frequency down conversion, gain control, and CORDIC rotation (Cartesian to polar conversion) independently and simultaneously on multiple input channels.

As shown in FIG. 2A, FPGA 208 implements a cross-bar switch 209, which routes up to sixteen (16) input channels provided by the three (3) receive paths. The sixteen (16) channels of data are processed by sixteen (16) corresponding direct data converters (DDCs) 210a-210p, which will be discussed in detail in further conjunction with FIG. 2B. Any or all of the sixteen (16) DDCs 210a-210p can be routed to any one of the four (4) sampled RF receive bands (LBRX, HBRX, UHFRX, 220 MHz). The simultaneous processed channels can be made up of data channels, voice channels, or a combination of voice and data. Additionally, each channel can be set for a different channel frequency and spacing, modulation type, and bit rate, for example, 9600 bps GMSK data in a 12.5 kHz channel, voice in a 25 kHz channel, 19200 bps GMSK data in a third 25 kHz channel, and 9600 bps 4FM data in a 6.25 kHz fourth channel. Two antennas may be used for each frequency channel to implement receive diversity.

The DDC output vectors from each DDC 210a-210d include Cartesian (I and Q), along with magnitude, phase, and instantaneous frequency, which support data and voice demodulators operating on polar data. The outputs from DDDs 210a-210p are stored in registers within I/O, Clock, and Control Buffers circuit block 211, also implemented within FPGA 208. For the transmit path of SDR 200 (buffers), FPGA 208 implements a finite impulse response (FIR) interpolator 211.

FPGA 208 operates in conjunction with a bus 213 and digital signal processor 214. In the illustrated embodiment, DSP 214 is a Texas Instruments TMS320C5510 DSP, which supports multiple channel demodulation operations, as defined in firmware. DSP 214 also runs digital signal coding for forward error correction (FEC) and privacy, and can support digital voice decoding using commercially available vocoder firmware applications. Advantageously, SDR 200 redistributes the computational load between FPGA 208 and DSP 214 such that a large portion of the high speed DSP processing typically found in existing radio receivers, for example CORDIC rotation and frequency differentiation, is now implemented in FPGA 208.

A direct memory access (DMA) system implemented with DSP 214 enables the transfer and buffering of blocks of data samples between buffers within buffers block 211 and the DSP memory space. For example, when a prescribed block length of receive data processed by a DDC 210a-210d has been collected within buffer, DSP 214 retrieves those data blocks using DMA and performs the balance of the data or voice demodulation tasks. DSP 214 then outputs from one (1) to four (4) user data streams to host processor 215 via host port interface 220. One (1) of those data streams can be a voice channel routed to an audio codec 216 after preprocessing by DSP 214. Audio codec 216 emits an analog voice audio signal.

Host processor 215 downloads the boot code configuring FPGA 206 and DSP 214. Advantageously, boot downloading can be performed before or after field deployment of SDR 200, and allows field code upgrades to the FPGA, DSP, and host operating systems.

A voltage controlled temperature compensated crystal oscillator (VCTCXO) 217 establishes the time base for the circuitry of SDR 200. In the illustrated embodiment, VCTXO 217 generates a 19.2 MHz clock signal, which is level shifted and buffered within FPGA 208 and then provided to DSP 214 as the master clock (MCLK) signal. This clock signal is also provided as a reference signal to clock generation circuitry 218. Clock generation circuitry 218 includes a 921.6 MHz frequency synthesizer, for example a National Semiconductor LMX2531 frequency synthesizer, along with frequency dividers and level shifters. Clock generation circuitry 218 provides a set of clock signals, and in particular, a 57.6 MHz clock signal for driving ADCs 203a-203c, as well as the clock signals needed by DDS 205 and DDCs 210a-210p.

Figure 2B:
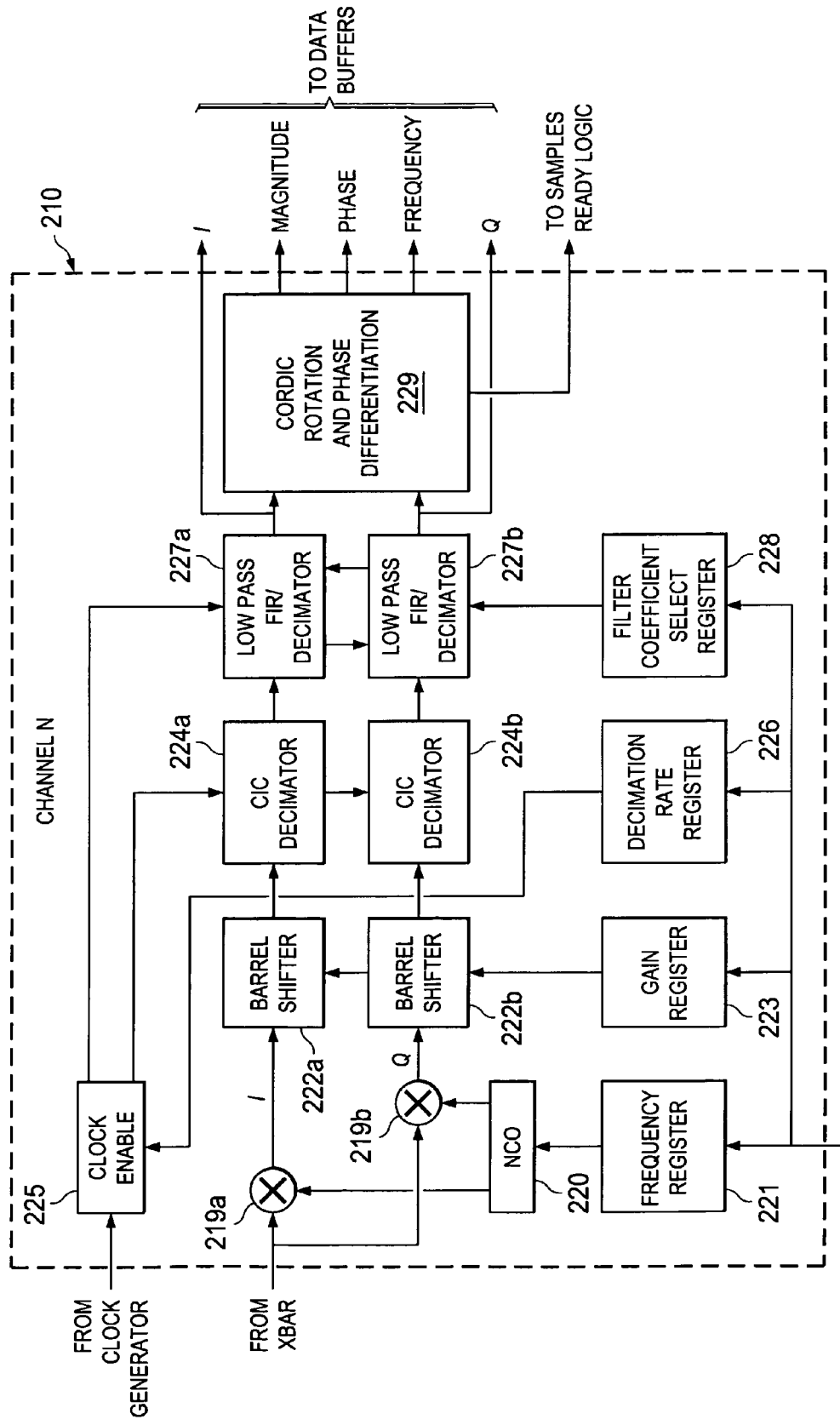
FIG. 2B is a more detailed block diagram of a selected one of the direct data converters (DDC) shown in FIG. 2A.

FIG. 2B is a more detailed block diagram of a selected one of DDCs 210a-210p of FPGA 208. As shown in FIG. 2B, digital mixers 219a and 219b, which are driven by numerically controlled digital oscillator (NCO) 220, generate in-phase (I) and quadrature (Q) signals from the input data received from crossbar switch 209. NCO oscillator 220 is controlled by frequency control data loaded into frequency register 221. Frequency register 221, gain register 223, decimation rate register 226, and filter coefficient register 228 are loaded from bus 213 by DSP 214. In the illustrated embodiment, host 215 sends DSP 214 digital receive and transmit values in Hz, which are then validated and converted into appropriate numerical values, and then stored in the corresponding register. (In alternate embodiments, host 215 may directly the load registers within FPGA 208 using the DSP DMA system.)

The I and Q signals are shifted in barrel shifters 222a-222b, under the control of data stored within gain register 223. Generally, barrel shifters 222a-222b selectively shift the bits of each value output from the corresponding mixer 221a-221b to double the digital gain for each bit shifted (with sign bits maintained in their current states).

The I and Q signals are then filtered and decimated by corresponding cascaded integrator-comb (CIC) filters 224a-224b, under the control of clock enable signals generated by clock enable circuit block 225 and the data loaded into decimation rate register 226. In the preferred embodiment, where the input data stream is received at 57.6 Msps, CIC filters 224a-224b decimate by 1200 in response to 48 kHz clock enable signals.

After decimation, the I and Q data streams are lowpass filtered and further decimated by lowpass filters (LPFs) 227a and 227b, also enabled by clock enable block 221. The FIR filter coefficients are selected through filter coefficient select register 228. In the preferred embodiment, LPFs 227a and 227b are 200-tap FIR filters that implement a cutoff frequency of 6 kHz. The decimated and filtered I and Q samples are then sent to buffers within buffers block 211 of FIG. 2A for collection into blocks for use in signal demodulation by DSP 214.

Each DDC 210a-210d also includes CORDIC rotation and phase differentiation circuitry 229, which generates digital magnitude, phase, and instantaneous frequency information. This feature advantageously supports demodulation algorithms running on DSP 214 that utilize polar data.

During data transmission processing, data packet bits received by DSP 214 through host port 220 from host processor 215 are converted to bipolar format and then passed to buffers within FPGA 208. FPGA 208 then performs premodulation FIR filtering (e.g. Gaussian for GMSK modulated data) and interpolation within FIR interpolating filter block 212. The resulting data are combined with the carrier frequency data and sent to DDS 205 for conversion into analog form and ultimate transmission as an RF signal.

For analog voice transmission, voice samples received by DSP 214 from voice Codec 216 are preprocessed prior to delivery to FPGA 208. In the illustrated embodiment, DSP 214 implements analog voice processing operations including pre-emphasis filtering, amplitude limiting, and a FIR filtering for voice frequency band limiting.

As discussed above, the DSP implemented functions, for example modulation and demodulation, generate or operate on blocks of samples that are contained in sample buffers within buffers block 211 of FPGA 208. These sample buffers are maintained by the DSP DMA system. Generally, the DSP DMA and hardware interrupt system services sample buffers for transferring data to and from DSP 214 to peripherals, such as FPGA 208. In the preferred embodiment, the DMA system supports up to eighteen (18) simultaneously active DMA channels, allocated as sixteen (16) receive channels, one (1) transmit channel, and one (1) audio channel.

In particular, the DMA system generates a real time interrupt when a new block of samples is ready (in the receive mode) or data are needed (in the transmit mode) for processing by DSP 214. Generally, the interrupt rate is derived from the system clock and is integrally related to the sampling frequencies, which can range from two (2) to ten (10) times the bit rate of the data stream being processed. In the case of transmission processing, the sample buffers are at the output of the signal processing chain, while during reception processing, the sample buffers are at the input of the signal processing chain.

Receive and transmit band and channel control is implemented by a set of tables accessed by DSP 214 and populated by host processor 215 on system start-up. The channel palette defines, in the preferred embodiment, up to twenty one (21) receive and transmit frequency pairs, along with the modulation parameter value that selects modulation type, FCC designated channel spacing, and bit rate. A channel palette validate routine validates the channel palette contents at system start up and whenever called by host processor 215 after a channel palette change. Generally, valid and invalid receive channels are marked, with the corresponding transmit channel of the pair similarly assumed valid or invalid. Unused channels are indicated by zeros.

A channel assignment table, which is a subset of the channel palette, identifies up to sixteen (16) active assigned receive channel numbers from the validated channel palette. The active assigned channels tune DDCs 210a-210p.

For signal reception on the sixteen (16) assigned receive channels, sixteen (16) corresponding sets of dual sample receive buffers are established in buffers block 211 of FPGA 208. Each pair of buffers stores either the I and Q output data or the phase, magnitude, and instant frequency output data generated by the associated DDC 210a-210p. In a ping-pong fashion, one dual sample buffer is filled by the DMA system while the other dual sample buffer is accessed to provide a sample block to the appropriate DSP demodulator routine. Whenever a sample block buffer is filled, a DMA interrupt occurs and its service routine moves the ping-pong buffer pointer(s) to the alternate buffer of the pair.

During voice operations, audio data samples are transferred by DMA between audio codec 216 and one of a pair of ping-pong audio sample buffers. Specifically, a single ping-pong buffer pair is used to transfer modulation samples from DSP 214 to FPGA 208 while the transmitter is keyed. FPGA 208 then accesses samples from one buffer and when that buffer is empty, the DMA system requests a new sample block from DSP 214 via an interrupt.

In the illustrated embodiment, host processor 215 can initiate transmission on one (1) active transmit channel defined in the channel assignment table. Specifically, a transmit key command, which indicates which of the assigned channels to transmit on, initiates a transmit operation. A receive stop routine interrupts reception on the selected channel. The corresponding modulation routine (e.g. GMSK, 4FM) being run by DSP 214 is initiated, along with activation of the required RF transmit circuits (not shown). A transmit state machine within FPGA 208 is enabled, such that FGPA 208 begins to generate interrupts to DSP 214 to transfer data into the ping-pong transmit buffers. On data channels, either individual transmit packet bytes or the entire packet is transferred to DSP 214 from host processor 215 via host processor interface 220.

Tasks being executed by DSP 214 are put into a task buffer, with each task indicating that an incoming block of samples is ready for processing by the given modulation routine being executed or that the samples in the current transmit buffer have been expended. Once the oldest task is begun, it runs to completion before the next oldest task is called. In particular, the transmit DMA interrupt from FPGA 208 enters the DSP transmit data modulator task in the next available position in the task buffer. When the task loop calls it, the modulator subroutine runs using packet data bits as input. DSP 214, through the DMA system, fills one of the data transmit sample block ping-pong buffers, as its output and then returns to the task buffer to start the next task.

Generally, the baseband modulation routine running on DSP 214 implements data pre-coding. The resulting output samples are scaled to generate a precise frequency offset that is interpolated by a FIR pre-modulation filter and then added to the carrier frequency phase increment in FPGA 208. The phase increment information is used by transmit DDS 205 to generate the desired carrier frequency.

During transmit of analog voice, audio codec 216 quantizes the voice or audio tone input from a microphone (not shown) into 16-bit pulse code modulation (PCM) samples at a fixed rate of around 8 ksps. These samples are collected by the DMA system into audio sample blocks. The baseband voice processor implemented by DSP 214 provides audio pre-emphasis (band-limited differentiation), amplitude limiting (clipping), and lowpass band limiting to about 3 kHz. The resulting samples are scaled for proper frequency deviation and placed in one of the transmit block sample buffers for use by FPGA 208.

During reception, if the desired reception channel has a valid entry in the channel table, the channel is activated. The phase increment is calculated and sent to FPGA 208 and the appropriate demodulation routine on DSP 214 is initiated. The applicable RF front end circuitry (not shown) is energized and initialized, as required. The DMA channel for the assigned DDC 210a-210d within FPGA 208 is also initialized and the DMA appropriate block interrupt is enabled. The DMA block interrupt, which is at the sample block rate, then controls transfer of sample blocks from FPGA 208 to DSP 214.

An interrupt service routine enters receive tasks each time a complete block of either I and Q or magnitude, phase, and instantaneous frequency data has been received in the corresponding receive ping-pong buffer. When the receive task is called, the receive sample block is operated on by the demodulation subroutines running on DSP 214. As discussed above, DDCs 210a-210d advantageously relieve DSP 214 of the burden of channel filtering, automatic gain control, automatic frequency control, decimation, and CORDIC rotation.

During analog voice reception, the sample blocks from the given DDC 210a-210p are passed through a de-emphasis filter (band-limited integrator). These PCM audio samples are put into a Codec output buffer and then delivered by the DMA system to the ADC and anti-alias low pass filter within audio codec 216. DSP 214 implements a separate high pass filter that selects only the high frequency noise output from the discriminator samples, performs amplitude detection, low pass filtering, and threshold detection. The result of the threshold detection is used as a voice audio output SINAD squelch decision for controlling audio gates downstream in the audio path.

Figure 3:
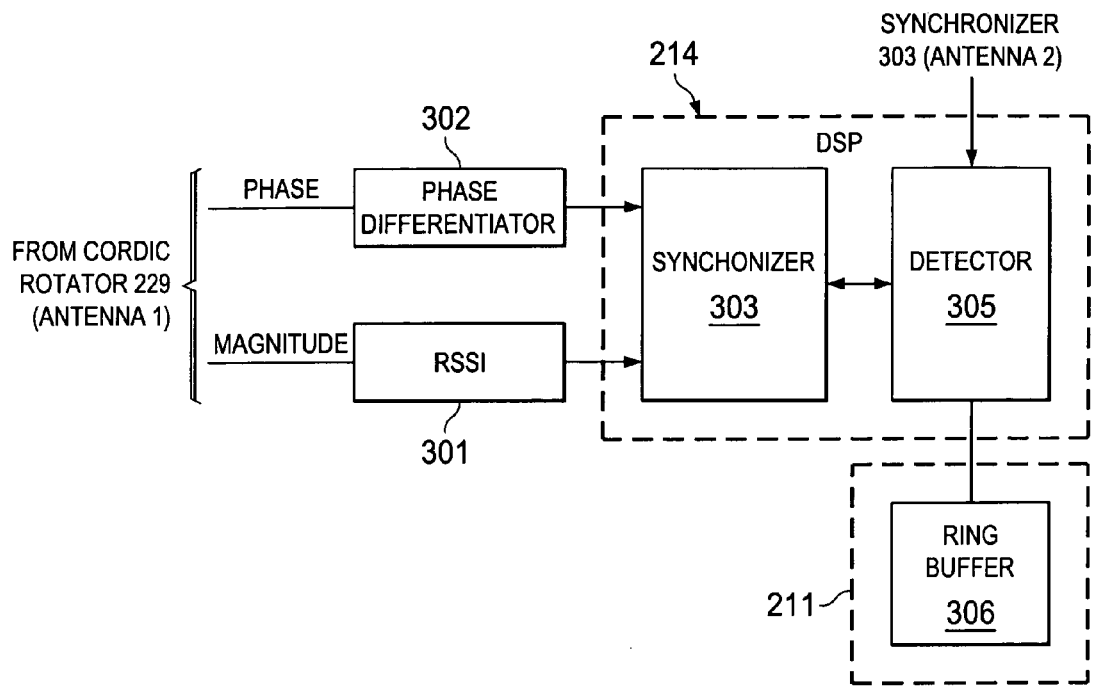
FIG. 3 is a more detailed block diagram of the synchronizer and detector for a selected channel according to the illustrated embodiment of the SDR shown in FIG. 2A.

FIG. 3 is a block diagram illustrating the demodulation functionalities of SDR 200. Generally, after pre-detection filtering by filters 227a-227b of FIG. 2B, the filtered I and Q samples are sent to CORDIC rotator 229 which generates digital magnitude and phase information. The magnitude information is used by RSSI (Received Signal Strength Indication) algorithm 301 to estimate the RSSI of the receive signal. The RSSI is subsequently used by detector 305 to determine whether a signal is present. The RSSI is also sent to gain control register 223 of FIG. 2 to perform AGC functionality. The phase information is passed to phase differentiation circuitry 302, which generates the phase difference or instantaneous frequency information.

The filtered I and Q samples, as well as the output of phase differentiator of block 302, are sent to buffers within buffers block 211 for collection into blocks for use in signal synchronization and detection. Synchronizer 303 and detector 305 can choose any of these buffers as the input signals.

The bit synchronization operation (Block 303, FIG. 3) first performs bit synchronization followed by frame synchronization. Input to the bit synchronization operation is a sequence of phase difference samples at a sample rate of 10 times the symbol rate. Bit synchronizer 303 detects the preamble part of each received packet and determines the best sample time within 10 samples per symbol. Bit synchronizer 303 also determines a frequency offset estimate (FOE), which is used to adjust the frequency offset of the receive signal. When a preamble is detected, the tuning frequency is adjusted by the FOE amount. The adjusted tuning frequency is converted into appropriate numerical values, and then loaded into frequency register 221 of FIG. 2B, which is used to control NCO oscillator 220.

After the best sample time is obtained, the sequence of phase samples is sampled according to the best sample time. The sequence of sampled phase symbols is sent to detector 305, where the bit detection is performed.

The frame synchronization operation takes the sequence of detected bits from the output of detector 305, and then determines the start of data information in the frame. After the start of a frame is identified, the detected bit sequence is input into a data register. The data register is used to collect one byte or 8 bits of data information. After one byte is complete in the data register, the data byte is put into ring buffer 306, together with first byte indicator and the channel number. The first byte indicator is of length one bit. The indicator is set to 1 when the start of frame is identified, and then reset to 0 after the first byte is complete.

The bit synchronization operation is preferably implemented in FPGA 208, while the bit detection and frame synchronization operations are preferably implemented in DSP 214. The blocks of symbol sequences to be sent to DSP 214 are stored in registers within I/O, block, and control buffers circuit block 211, also implemented within FPGA 208. DSP 214 then takes the data from the data registers in FPGA 208 using appropriate protocol such as SPI or McASP interfaces.

The demodulator process shown in FIG. 3 sequentially processes the signal blocks from the receive DDC channels 210, one signal block per channel at a time. For example, the demodulator processes one signal block from DDC Channel 1, then processes one signal block from DDC Channel 2, and so on. After the demodulator algorithm finishes processing one signal block from every DDC channel, the demodulator starts processing the next signal block from DDC Channel 1, and the same process continues.

As the demodulator algorithm processes the multi-channel signals sequentially, ring buffer 306 carries the interleaved data information from all the receive channels. Each element in ring buffer 306 is a 16-bit word, in which bits 0 to 7 (0 is the LSB) carry 1 byte of detected data bits, bits 8-14 carry the channel number, and bit 15 (MSB) is the first byte indicator.

Host port interface 220 takes the data from ring buffer 306 to host 215, where the multi-channel data sequence is de-interleaved into channel data streams.

Returning to FIG. 2B, pre-detection filters 227, in the illustrated embodiment, are selected based on the channel waveform being processed by the given DDC 210. For constant envelop modulations including GMSK, GFSK, SOQPSK, and 4FM modulations, pre-detection filters 227 are 200-tap FIR filters that use a Hamming window of length two hundred and one (201). The bandwidth can be either 6 kHz or 13 kHz. A FIR filter with a pre-detection bandwidth of 13 kHz is used for waveforms that are designed for a channel width of 25 kHz (see Table 1). A FIR filter with the pre-detection bandwidth of 6 kHz is used for waveforms that are designed for a channel width of 12.5 kHz.

For linear modulations including DQPSK and π/4 DQPSK, pre-detection filters 227 are square root raised cosine (RRC) filters that match to the transmit pulse shaping filters. For example, for π/4 DQPSK signal in the ITCNET system, the pre-detection filter is an RRC filter with a roll-off factor, a, of 0.35.

The decimated and filtered I and Q samples output from pre-detection filters 227 are then sent to buffers within buffers block 211 for collection into blocks for use in signal demodulation. Each buffer may carry 100 samples of I or Q samples from one DDC channel.

CORDIC rotator 229 of FIG. 2B performs a coordinate rotation using a coordinate rotation digital computer algorithm, which is a simple and efficient algorithm to calculate hyperbolic and trigonometric functions. CORDIC is based on rotating the phase of a complex number, by multiplying it by a succession of constant values. The multiplications can all be powers of 2, and can be done using shifts and adds in binary arithmetic. Therefore no actual multiplier function is needed.

CORDIC rotator 229 takes the filtered I and Q samples from pre-detection filters 227, performs a coordination rotation, and outputs the magnitude and phase information of the input signals. The phase information is in the range between −π and +π.

CORDIC rotator can be implemented in an Altera FPGA using the CORDIC DSP builder advanced block set. The CORDIC rotator block takes four inputs, x, y, p, and v. The x and y inputs represent the (x, y) coordinates of the input vector, the p input represents the angle input, and the v represents the mode of the CORDIC block. To obtain the phase of the I and Q input signals, the x input is connected to the I samples, the y input is connected to the Q samples, the p input is set to a constant 0, and the v input is set to 1. With this setup, the CORDIC block rotates each I and Q pair to the x-axis, and then outputs the angle, p, required to make that rotation, as well as the x and y coordinates of the output vector. The p output represents the phase of the input signals, while the x output represents the magnitude of the input signals. The output vectors are of the same length as the input vectors.

Alternatively, the phase of I and Q samples can be obtained in DSP 214 using an inverse tangent function (e.g., a tan 2_16), which, for a TI C6747 DSP, is included in the DSP chip support library. The magnitude of I and Q samples can also be obtained by adding the absolute square values of I and Q samples.

Similar to I and Q samples, the samples of phase and magnitude information are sent to buffers within block 211 of FIG. 2A. Each buffer may carry 100 samples of phase or magnitude samples from one DDC channel.

RSSI estimator 301 of FIG. 3 first averages the magnitude values of the received samples in one buffer block, and then converts the obtained average magnitude value to dB relative to full scale.

Specifically, to obtain the average magnitude value, the magnitude values of the received samples are added together. The summation result is normalized by a scaling factor corresponding to the number of added samples. To obtain the RSSI estimate, the average magnitude value is converted to dB relative to full scale using an LUT.

After the RSSI estimate is obtained, an AGC routine is performed to update the gain at the DDC input, if necessary. The AGC routine basically compares the RSSI estimate with a threshold. If the RSSI estimate exceeds the threshold, the AGC routine turns the gain down for the given DDC. This is accomplished by loading the updated gain into gain register 223 of FIG. 2B.

The RSSI estimate is also sent to synchronizer 303 and detector 305 for signal detection purpose, and sent to host processor 215 for the use in higher layer functionalities such as node connectivity, base selection, and network management functions.

Phase differentiator 302 of FIG. 3 takes each buffer block of K number of (e.g., K=100) phase samples from the CORDIC rotator, delays the input sequence by L samples, and outputs the difference between the input sequence and the delayed sequence. The phase differentiator also includes an L-sample delay line that keeps the last L sample of the current phase sequence block. The L samples in the delay line are used as the initial delayed samples for the next block.

The number of delay samples, L, depends on the waveform. For constant envelope modulation waveforms (GMSK, GFSK, SOQPSK, and 4FM), L is set to one. For DQPSK waveform, L is set to the number of samples per symbol. In case of DQPSK waveform with 10 samples per symbol, L is set to 10.

The phase differentiator in one embodiment of SDR 200 implemented, in either FPGA 208 or DSP 214, as follows. First, the algorithm is initialized, with the phase delay line, $\tilde{\phi}_k$, initially set to a zero-vector of length L, i.e., $\tilde{\phi}_k=0$, for k=0, 1, . . . , L−1. A block of K phase samples, $\phi_k$, for k=0, 1, . . . , K−1, is input to phase differentiator 302 and then delayed by L number of samples.

Next, a block of K phase difference samples $\Delta\phi_k$, for k=0, 1, . . . , K−1, is obtained from the difference between the input sequence and the delayed sequence as $$\Delta\phi_k = \begin{cases} \phi_k - \tilde{\phi}_{k'} & 0 \le k \le L-1 \\ \phi_k - \phi_{k-L'} & L \le k \le K-1 \end{cases}$$

The phase difference sample $\Delta\phi_k$ is normalized to have the value between −π and π. Then, the phase delay line is updated to the last L samples in the input sequence, i.e., $\tilde{\phi}_k=\phi_{k-L+K}$, for k=0, 1, . . . , L−1. The procedure is repeated for the next input block.

The phase differentiator outputs the block of K phase difference samples to the synchronizer and detector.

Figure 4:
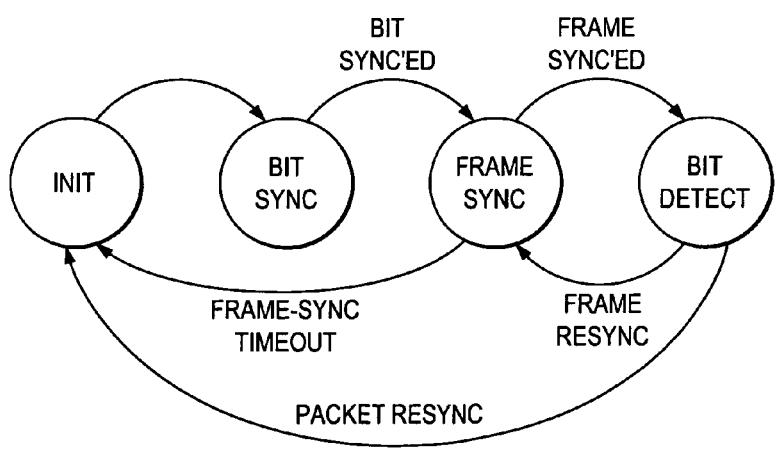
FIG. 4 is a state diagram illustrating the data flow during frame and bit synchronization and bit detection according to the illustrated embodiment of the SDR shown in FIG. 2A.

Synchronizer 303 and detector 305 process the block of K phase difference samples from phase differentiator 302, block by block, as represented by a data flow diagram in FIG. 4. As shown in FIG. 4, the data flow of synchronizer and detector operations includes four states, namely initialization (INIT), bit synchronization (BIT SYNC), frame synchronization (FRAME SYNC), and bit detection (BIT DETECT).

In the Initialization (INIT) state, all functions, parameters, and buffers in synchronizer 303 and detector 305 are initialized. As a default, the demodulator starts in the INIT state, performs initialization operation, and then goes to the BIT SYNC state.

In the Bit Synchronization (BIT SYNC) state, synchronizer 303 performs a bit synchronization operation to determine the presence of a packet and estimate the best symbol timing. As discussed further below, the bit synchronizer takes the block of K phase difference samples for the current channel, and then performs a bit synchronization algorithm. With 10 samples per symbol, the best symbol timing can be any integer values between 1 and 10.

When the bit synchronization algorithm detects the preamble part of the received packet and obtains the best symbol timing, the best symbol timing is stored in a register and the demodulator algorithm then goes to the FRAME SYNC state. Also in the BIT SYNC state, the bit synchronizer estimates the frequency offset of the received signal. The bit synchronizer updates the frequency offset estimate (FOE) every received block of K phase difference samples, and stores the FOE in a register. The obtained FOE is used in the bit synchronization algorithm, but it is only sent to adjust NCO 220 when the preamble part of the received packet is detected. When the bit synchronizer detects the preamble, the FOE is converted into appropriate numerical values, and then loaded into the frequency register, which is used to control NCO 220.

In the Frame Synchronization (FRAME SYNC) state, the synchronizer performs the frame synchronization operation to determine the start of data frame in the received packet. Each data frame starts with a frame sync pattern followed by data information, as will be discussed in details below. Hence, during the FRAME SYNC state, the frame synchronization algorithm searches for the frame sync pattern.

In the FRAME SYNC state, the block of K phase samples is sampled according to the best symbol timing, and then the block of sampled phase sequences is sent to detector 305. Detector 305 performs bit detection algorithm and outputs the detected bits, as discussed below. The frame synchronizer inputs the detected bits into a sync register and then compares the bit information in the sync register with that in the frame sync pattern. If the number of bit differences is less than a certain threshold, the frame synchronizer indicates that the frame sync is found and sets the first byte indicator to 1.

When the frame sync pattern is found, the start of data information is identified, and the demodulator goes to the BIT DETECT state. At the beginning of the FRAME SYNC state, a sync timer is set. If the frame sync is not found before the sync timer is expired, then the demodulator goes back the initialization state.

In the Bit Detection (BIT DETECT) state, the block of K phase samples is sampled according to the best symbol timing, and then the block of sampled phase sequence is sent to detector 305.

Detector 305 takes the sampled phase symbols, performs a bit detection algorithm, and outputs the detected bits. In this state, the detected bits are placed into a data register. After the data register is filled with 8 bits (1 byte) of information data, the data byte, together with the first byte indicator and the channel information, are put into ring buffer 306 and the data register is reset. After the first byte is completed and put into the ring buffer, the first byte indicator is reset to 0.

The demodulator stays in the BIT DETECT state until a RESYNC command is received from host 315. The host may send a PACKET RESYNC command to the demodulator at the end of the received packet or when the host finds that the packet is invalid (e.g., the CRC check fails, the FEC decoder cannot correct any errors, or the packet type is invalid). When the demodulator receives the PACKET RESYNC command from the host, the demodulator goes back to the initialization state.

Another RESYNC command that can be sent from host 315 is the FRAME RESYNC command. The FRAME RESYNC command is applicable for a continuous transmission where the transmit radio sends bit sync information at start-up and then alternately sends frame sync information and frames of data. In this case, the host may send the FRAME RESYNC command at the end of the data frame.

After receiving the FRAME RESYNC command, the demodulator goes to the FRAME SYNC state where the demodulator searches for the frame sync pattern. Alternatively, the demodulator can treat the entire receive sequence (including the frame sync and frames of data) after the first frame sync as data and send the entire receive data sequence to the host. In this case, the host searches for the frame sync within the data frames to identify the start of each data frame.

Figure 5:
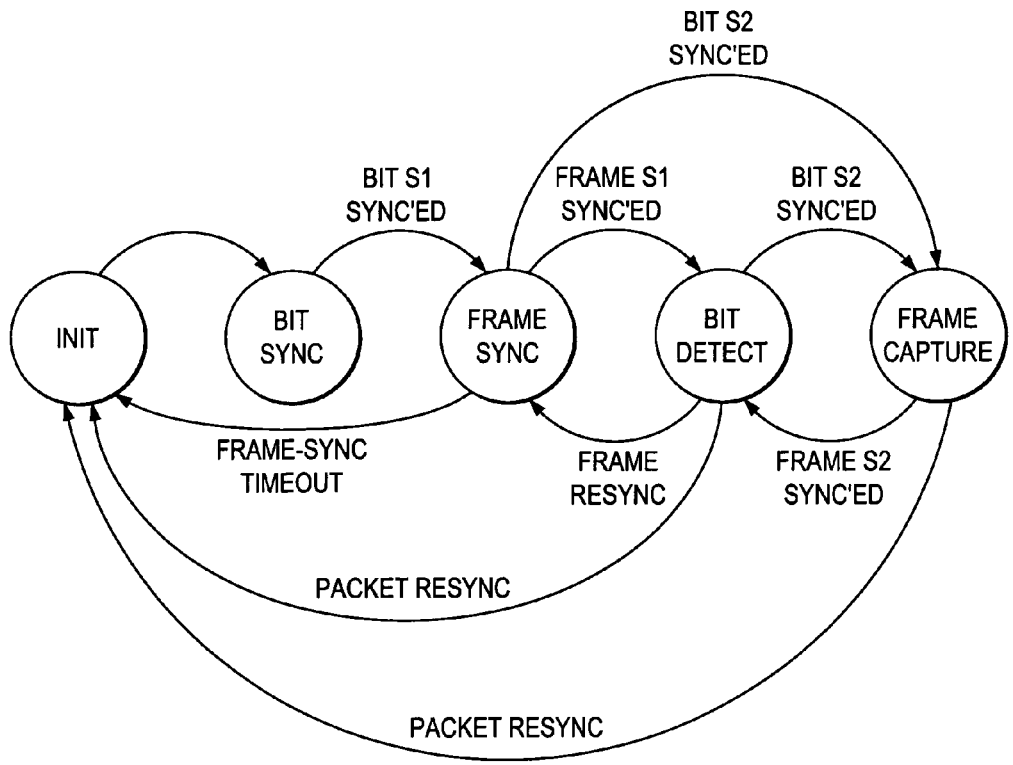
FIG. 5 is a state diagram illustrating the data flow during frame and bit synchronization and bit detection, with capture effect, according to the illustrated embodiment of the SDR shown in FIG. 2A.

Synchronizer 303 and detector 305 can be implemented to support the capture effect, which is the ability of the radio to receive or capture a strong signal from one transmitter while receiving a weaker signal from another transmitter, as shown in FIG. 5. As shown in FIG. 5, the data flow of synchronizer and detector with capture effect include five states, namely initialization (INIT), bit synchronization (BIT SYNC), frame synchronization (FRAME SYNC), bit detection (BIT DETECT), and frame capture (FRAME CAPTURE).

The INIT and BIT SYNC states are the same as described above for the case of no capture effect. The FRAME SYNC state also includes the same functionalities as that in the case of no capture effect. Additionally, while the frame synchronization is performed to search for the frame sync based on the best symbol timing, the bit synchronization is also performed to determine the presence of a stronger signal and obtain the best symbol timing for the stronger signal.

As in case of no capture effect, the demodulator goes to the BIT DETECT state when the frame sync is found, or goes to the INIT state if the sync timer is expired. If the stronger signal is detected and the best symbol timing for the stronger signal is obtained, then the demodulator goes to the FRAME CAPTURE state.

The BIT DETECT state includes the same functionalities as that in the case of no capture effect. Additionally, while the bit information is detected, the bit synchronization is also performed to determine the presence of a stronger signal and obtain the best symbol timing for the stronger signal.

As in case of no capture effect, the demodulator goes to the INIT state when a PACKET RESYNC command is received, or goes to the FRAME SYNC state when a FRAME RESYNC command is received. If the stronger signal is detected and the best symbol timing for the stronger signal is obtained, then the demodulator goes to the FRAME CAPTURE state.

The demodulator enters the FRAME CAPTURE state when a stronger signal is detected while receiving a weaker signal. During the FRAME CAPTURE state, the demodulator continues to process the weaker signal as it does in case of no capture effect. At the same time, the frame synchronizer searches for the frame sync of the stronger signal based on the new best symbol timing and FOE obtained in the BIT DETECT state.

When the frame sync of the stronger signal is found, the demodulator goes to the BIT DETECT state and performs the bit detection based on the best symbol timing for the stronger signal. The demodulator goes to the INIT state if a PACKET RESYNC command is received from the host.

When a receive signal in the diversity channel is available, the signals from the main and diversity channels are combined at detector 305. The combining algorithm can be based on equal gain combining where soft-decision symbols from the main and diversity channels are added before the bit detection process. Alternatively, the demodulator can independently detect the bit sequence from the main and diversity channels, and output the bit sequences from both channels to host 215. The host may then receive and validate both bit sequences. If the packets from main and diversity channels are both valid, the host may keep only one packet and discard another or pass both packets to the higher processing layers.

Generally, the sync pattern is part of the physical layer overhead that is prepended to the data, forming an RF packet that is transmitted over the air. The sync pattern is then used at the receiver to synchronize and demodulate the data in the received packet, as previously discussed. The sync pattern generally includes a bit sync pattern and a frame sync pattern. The bit sync pattern is used to estimate the initial symbol timing and frequency offset, while the frame sync pattern is used to identify the start of data frame.

Figure 6:
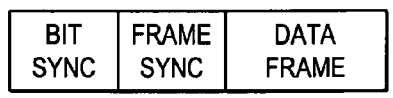
FIG. 6 is a diagram of a representative data packet including one data frame.
Figure 7:
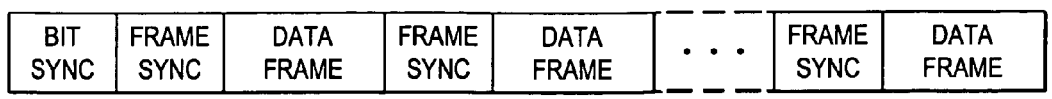
FIG. 7 is a diagram of another representative data packet including multiple data frames.

An RF packet may comprise one or multiple data frames. In the ITCNET, MBNET, and HPDR protocols, the RF packet comprises only one data frame. In this case, the RF packet starts with a bit sync pattern, followed by a frame sync pattern and then the data frame, as shown in FIG. 6. In ATCS protocol, a base radio may be configured for continuous operation, where the radio sends the bit sync pattern at start of packet transmission, and then alternatively sends frame sync and frames of data. As shown in FIG. 7.

In particular, the bit sync pattern is sent at the start of a packet transmission and is used by the demodulator to estimate the initial symbol timing. The symbol timing estimate obtained from the bit sync pattern may be used for the entire packet demodulation, or updated during packet demodulation through a symbol tracking algorithm. The bit sync pattern also depends on the signal waveforms as follows.

For the waveforms with one bit per symbol such as the GMSK and GFSK waveforms, the bit sync pattern is a sequence of bits consisting of alternating 1s and 0s. The bit sync pattern can be 1 1 0 0 1 1 0 0 1 1 0 0 . . . (i.e., a repeat of 0xCC), or
1 0 1 0 1 0 1 0 1 0 . . . (i.e., a repeat of 0xAA);
where 0x is a representation of bit sequence in hex, in which each character is hex for a 4-bit sequence.

The length of bit sync pattern is a configurable parameter which can be set based on the protocol. The MBNET protocol uses 14 bytes of a 0xCC bit sync pattern, while the ATCS protocol uses 4 bytes of a 0xAA bit sync pattern.

For waveforms with two bits per symbol such as the 4FM and DQPSK waveforms, the bit sync pattern is a sequence of bits consisting of a repeat of 1 0 1 1 1 0 1 1 or 0xBB pattern.

The frame sync pattern is sent at the start of a data frame and is used for the receiver to identify the start of data frame which is the first bit after the frame sync pattern. In ITCNET, MBNET, and HPDR protocols, the frame sync pattern is a 3-byte sequence, defined as 0xF8C549. In ATCS protocol, the frame sync pattern is a 4-byte sequence, defined as 0x07092A446F and its inverted version.

According to the principles of the present invention, the following bit synchronization operation is performed by the demodulator to estimate the symbol timing and the frequency offset of the received baseband signal. Let the sample rate of the signal sequence at the output of the given DDC 210 be N times the symbol rate (e.g. N could be 10). The symbol timing is an integer number between 0 and N−1 that is selected as the best sampling time within the N samples to obtain the symbol information.

The bit sync operation comprises two phases, the acquisition phase and tracking phase. In the acquisition phase, bit synchronizer 303 estimates the initial symbol timing using the sync pattern at the beginning of the packet or the data frame. The tracking phase is used to keep track of the symbol timing.

For the demodulation of short packets, e.g. the packets in the ITCNET, MBNET, and HPDR protocols, the symbol timing obtained in the acquisition phase can be used for the entire packet demodulation. For the demodulation of long packets, e.g. the packet in ATCS protocol, the optimum symbol timing change due to channel distortion or jitter. In this case, timing tracking helps maintain the timing synchronization between the transmitter and the receiver sides.

SDR 200 implements two synchronization algorithms in the acquisition phase, namely S-curve builder based (SBB) and sequence correlator based (SCB) algorithms. The SBB algorithm is used in the MBNET protocol, while the SCB algorithm is used in the ITCNET and ATCS protocols. SDR 200 also implements a timing tracking algorithm based on a first order digital phase locked loop (DPLL).

The SBB synchronization algorithm processes blocks of K phase difference samples, one block per channel at a time. The fundamental concept of the SBB synchronizer is to build an S-curve from the input samples using a circular bank of low pass (LPF) filters. The S-curve vector is of length M=2qN, where N is the number of samples per symbol, and q is set to 2 for 0xCC bit sync pattern and set to 1 for 0xAA and 0xBB patterns. Table 2 lists the q value and the length of S-curve vector for each bit sync pattern.

TABLE 2

| Bit Sync Pattern | No. of Bits per Symbol | Value of q | S-Curve Length (M = 2 qN) |
|---|---|---|---|
| 1 1 0 0 1 1 0 0 . . . (0xCC) | 1 | 2 | 4 N |
| 1 0 1 0 1 0 1 0 . . . (0xAA) | 1 | 1 | 2 N |
| 1 0 1 1 1 0 1 1 . . . (0xBB) | 2 | 1 | 2 N |

Each element in the S-curve vector is a LPF of the modified phase difference samples. The LPF is an IIR filter of the form:

$$Y_n=(1-\alpha)X_n+\alpha Y_{n-1}, \text{ where } 0<\alpha<1, X_n \text{ is the input sequence, and } Y_n \text{ is the output sequence.}$$

The phase difference sample is first modified by low pass filtering and adjusting the DC gain. Then the modified sample is passed through the LPF before being placed into the S-curve vector at the position specified by the vector index. The vector index is an integer variable associated with the S-curve vector. The vector index is used to indicate the element in the S-curve vector to place the filtered sample. The vector index is initially 0, incremented by 1 after a sample is added in the S-curve vector, and rolled back to 0 after the index exceed the length of the S-curve vector.

During the reception of bit sync sequence, which comprises alternating two symbol values, an S-curve shape will be formed in the S-curve vector. The S-curve contains one peak and one valley. At the point when the peak and valley of the S-curve satisfies the SBB sync criteria, the symbol timing is obtained. The SBB sync criteria include the followings:

The peak of the S-curve is higher than a threshold;
The valley of the S-curve is lower than a threshold; and
The peak and the valley of the S-curve is spaced by q symbols (i.e., qN samples)

Figure 8:
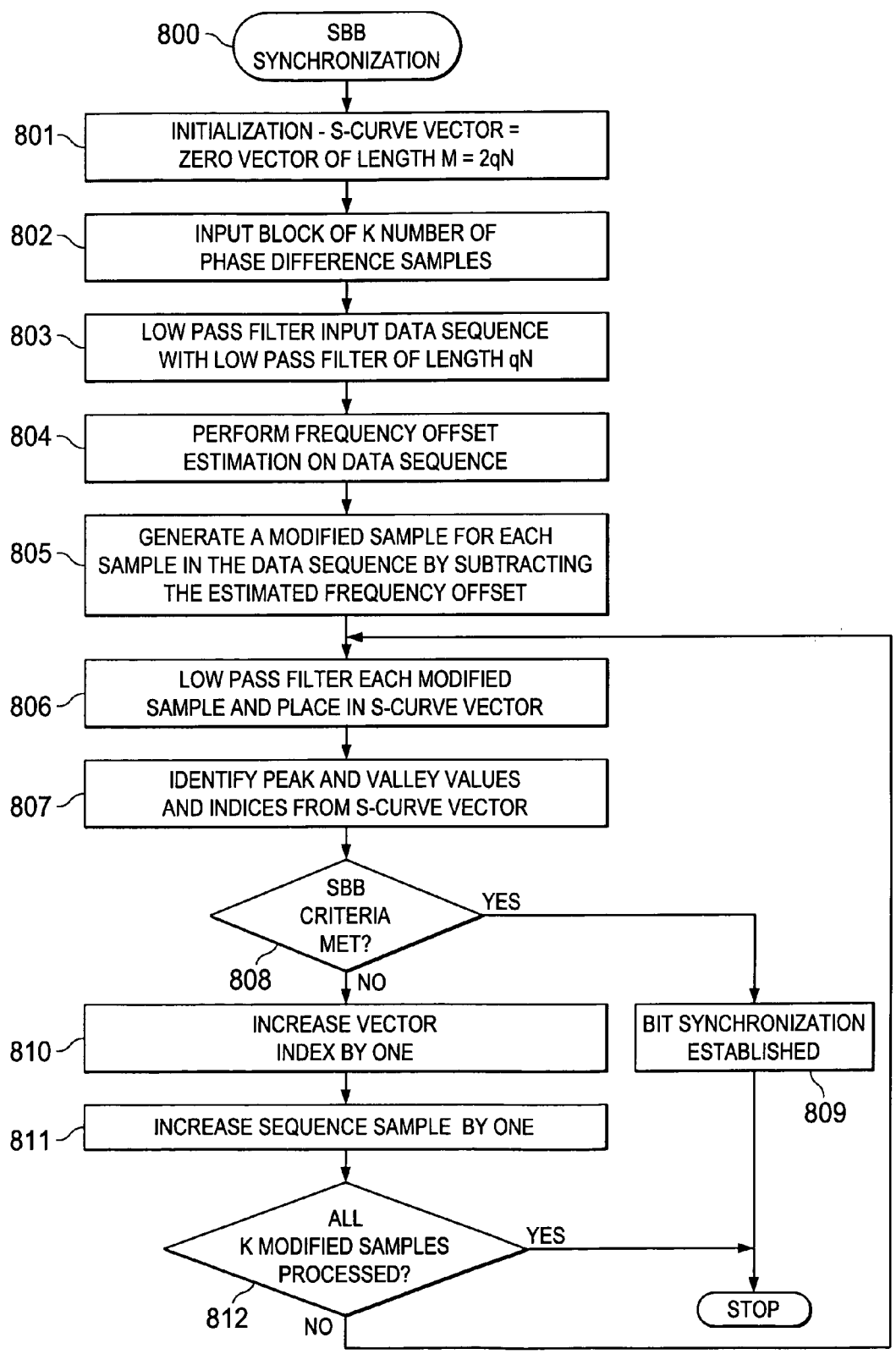
FIG. 8 is a flow diagram of a preferred S-curve builder based (SBB) synchronization procedure.
Figure 9:
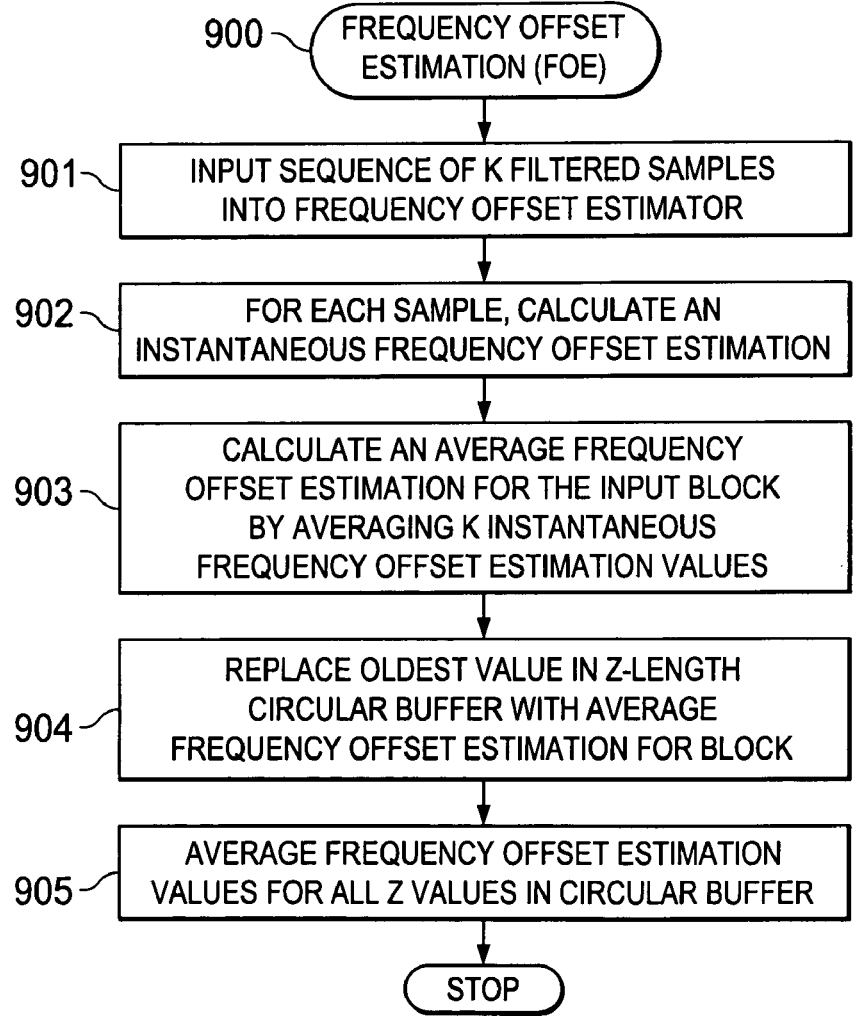
FIG. 9 is a flow diagram of a preferred frequency offset estimation (FOE) procedure.

A preferred SBB synchronization algorithm 800 according to the principles of the present invention is described in the flow chart of FIG. 8.

Initialization is performed at Block 801, where the S-curve vector, $s_m$, is initially a zero-vector of length M=2qN, i.e. $s_m$=0, for m=0, 1, . . . , M−1. The corresponding vector index is set at 0. The initialization step is performed in the INIT state shown in FIGS. 6 and 7.

At Block 802, a block of K phase difference samples, $\Delta\phi_k$, for k=0, 1, ..., K−1, is input to the SBB synchronizer. The input sequence is then low pass filtered with a boxcar low pass filter of length qN, at Block 803.

At Block 804, the sequence of K filtered samples is input to a frequency offset estimator, which performs frequency offset estimation and then outputs a frequency offset estimate (FOE), v. Operation of the frequency offset estimator is discussed below. Next, at Block 805, each of the K filtered samples is modified by subtracting the FOE, v, resulting in a modified sample $X_k=\Delta\phi_k-V$.

At Block 806, each of the k modified samples, $X_k$, for k=0, 1, ..., K−1 is low pass filtered and placed into the S-curve vector as follows. For a modified sample k (k=0, 1, ..., K−1), the S-curve vector index is m, and the element in the S-curve vector at the vector index position is $s_m$. The modified sample k is low pass filtered and updated to the $s_m$ as $$S_m=(1-\alpha)X_k+\alpha s_m$$

where α is a configurable parameter, ranging between 0 and 1, with a default value of 0.85.

The peak and valley values and the corresponding indices for the peak and valley values are identified from the S-curve vector at Block 807. Next, at Block 808, the three SBB criteria are checked based on the obtained peak and valley values. If all three criteria are met and the signal magnitude is larger than the threshold, then the bit synchronization is established (Block 809), the FOE is sent to adjust NCO 220, and the symbol timing is set to the index of the peak or the valley, whichever is less.

Otherwise, at Block 810, the vector index is increased by 1 by setting m=m+1. If the updated index m is larger than the S-curve vector length, then m is set to 0. The sequence sample is increased by 1 by setting k=k+1 at Block 811. At Block 812 the algorithm returns to Block 806 and the steps in Blocks 806-810 are repeated until all K modified samples are processed.

The frequency offset estimator takes the sequence of K filtered samples from the boxcar filter, performs the FOE operation, and outputs an FOE value. For each active receive channel, the FOE estimator includes a circular buffer of length Z (e.g., Z could be 2 or 4). Each element in the circular buffer keeps an FOE average over one block of K samples in that receive channel. A preferred FOE algorithm 900 is shown in the flow chart of FIG. 9.

The sequence of K filtered samples, $\psi_k$, is input to a frequency offset estimator at Block 901. At Block 902, for each input sample, $\psi_k$, an instantaneous FOE is obtained as $$v_k=0.5(\psi_k+\psi_{k-qN})$$

An average FOE for the current input block is obtained by averaging over the K instantaneous FOE values (Block 903). Then, at Block 904, the obtained average FOE for this input block is input into the Z-length circular buffer by replacing the oldest element in the buffer. Finally, the average FOE, v, is obtained by averaging all Z elements in the circular buffer at Block 905.

Figure 10:
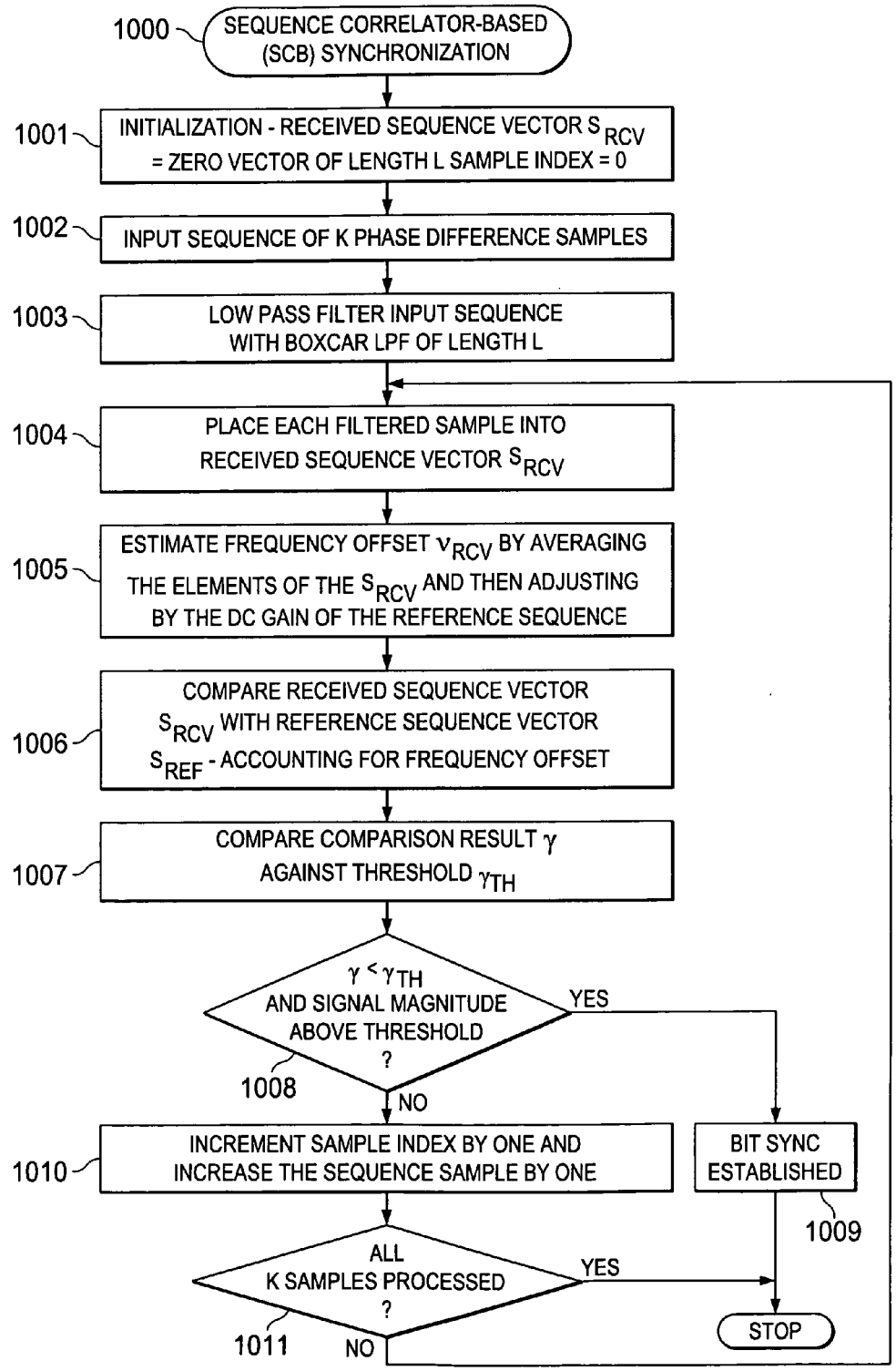
FIG. 10 is a flow chart of a preferred sequence correlator-based (SCB) bit synchronization procedure.

A sequence correlator-based (SCB) synchronization algorithm 1000 according to one embodiment of the principles of the present invention is shown in the flow chart of FIG. 10. Generally, the SCB synchronizer processes blocks of K phase difference samples, one block per channel at a time. The SCB synchronizer jointly estimates the symbol timing and the frequency offset by searching for a match between the received sequence of phase difference samples and a reference sequence. When the match is found, the timing and frequency offset that results in the match are established respectively as the symbol timing and FOE of the received signal.

The SCB synchronizer processes a vector of the received sequence, $S_{RCV}$, and a vector of the reference sequence, $S_{REF}$, both having the same length L. The reference sequence, $S_{REF}$, is generated for each type of waveform and stored in a memory, which could be an on chip memory or an SDRAM. The reference sequence can be constructed from the bit sync pattern, the frame sync pattern, or both, taken from a reference data packet.

In the ITCNET, MBNET, and HPDR protocols, where the RF packet carries only one frame sync, which follows the bit sync pattern (see FIG. 6), the reference sequence can be constructed from the both bit sync and frame sync patterns. In ATCS protocol where the RF packet carries an alternate of frame sync and data frames (see FIG. 7), the reference sequence is preferably constructed from the frame sync pattern only. This allows a receiver that misses the beginning part of the packet, which contains the bit sync pattern, to synchronize and receive the latter part of the packet.

In algorithm 1000 of FIG. 10, the reference sequence has a length of P symbols, with N samples per symbol. In other words, the reference sequence is of the length L=PN samples. For a specific sync pattern and waveform, the L-sample reference sequence can be constructed using algorithm 1100 shown in the flow chart of FIG. 11, for the illustrated embodiment.

Figure 11:
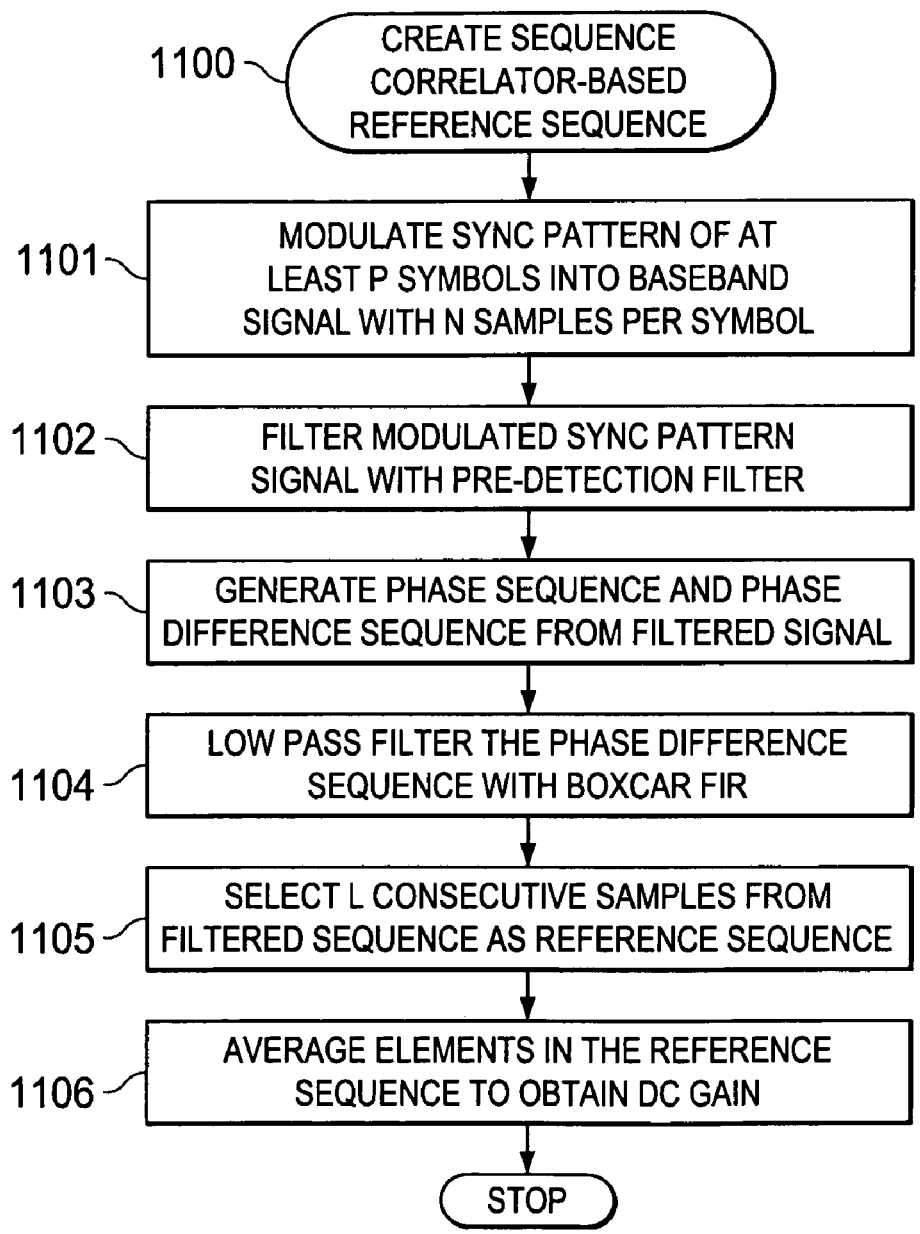
FIG. 11 is a flow chart of a preferred procedure for generating reference sample sequences for use in the SCB bit synchronization procedure of FIG. 10.

As shown in FIG. 11, at Block 1101, a sync pattern (bit sync, frame sync, or both) carrying at least P symbols is modulated into the baseband signal with N samples per symbol (i.e., the sample rate is N times the symbol rate), following the same steps used to modulate the transmit signal. The modulated signal is filtered with the pre-detection filter (Block 1102) and a phase sequence and a phase difference sequence are obtained from the filtered signal (Block 1103).

Next, at Block 1104, the phase difference sequence is low pass filtered with a boxcar LPF of length N. Then, L consecutive samples in the filtered sequence are selected for the reference sequence (Block 1105). Specifically, the L-sample sequence is selected such that the first sample in the sequence is also the first sample in the N-sample symbol. Finally, at Block 1106, the DC gain of the reference sequence is obtained by averaging the elements in the reference sequence.

Returning to FIG. 10, generally, the SCB synchronization algorithm performs the following. The vector of the received sequence, $S_{RCV}$, is a circular buffer of length L, and initially is a zero vector. For every received block of K phase difference samples, the received sequence is first filtered by a boxcar LPF. Next each of the filtered samples is placed into the $S_{RCV}$ vector. Associated with the input filtered sample is a sample index. The sample index, ranging from 0 to N−1 is used to indicate the symbol timing. The sample index is initially 0 and incremented by one for every sample placed into the $S_{RCV}$ vector. A frequency offset is estimated from the $S_{RCV}$ vector. Then the updated $S_{RCV}$ vector is compared to the reference sequence, $S_{REF}$ with the FOE taken into account. If the difference between the received sequence and the reference sequence is less than a pre-specified threshold, then bit synchronization is established and the symbol timing is obtained.

The preferred SCB synchronization algorithm 1000 of FIG. 10 can now be described in particular detail, beginning with initialization at Block 1001, where the received sequence vector, $S_{RCV}$, is initially a zero-vector of length L, i.e. $S_{RCV}[l]=0$, for $l=0, 1, \ldots, L-1$ and the sample index is initially 0. The initialization step is performed in the INIT state of FIGS. 4 and 5.

At Block 1002, a block of K phase difference samples, $\Delta\phi_k$, for $k=0, 1, \ldots, K-1$, is input to the SCB synchronizer. The input sequence is low pass filtered with a boxcar LPF of length N at Block 1003.

At Block 1004, each of the k filtered samples, $X_k$, for $k=0, 1, \ldots, K-1$, is placed into the received sequence vector, $S_{RCV}$, as follows. For a filtered sample k ($k=0, 1, \ldots, K-1$), the last L-1 elements in vector $S_{RCV}$ are shifted to the left by one position, i.e., $S_{RCV}[l]=S_{RCV}[l+1]$, for $l=0, 1, \ldots, L-2$. The k filtered sample, $X_k$, is placed in the last position of the vector $S_{RCV}$ as $S_{RCV}[L-1]=X_k$.

A frequency offset, $V_{RCV}$, is estimated by first averaging the elements in the $S_{RCV}$ vector and then adjusting by the DC gain of the reference sequence (Block 1005). (The DC gain of the reference sequence having been generated in procedure 1100 of FIG. 11.)

At Block, 1006, the received sequence vector, $S_{RCV}$, is compared to the reference sequence vector, $S_{REF}$, with the frequency offset taken into account, as:

$$y = \frac{N}{L} \sum_{l=0}^{\frac{L}{N}-1} |S_{REF}[Nl] - S_{RCV}[Nl] + V_{RCV}|$$

The comparison result, y, is now compared with a threshold, $y_{TH}$, at Block 1007. If the result is less than the threshold (i.e., $y<y_{TH}$) and the signal magnitude is larger than the threshold (Block 1008), then the bit sync is established (Block 1009), the FOE $V_{RCV}$ is sent to adjust the NCO, and the symbol timing is set to the sample index.

Otherwise, at Block 1010, the sample index is incremented by 1 and the sequence sample is increased by 1 by setting $k=k+1$. (If the value of the sample index exceeds N-1, then the sample index is set at zero.)

At Block 1011, the steps at Blocks 1004-1010 are repeated until all K samples are processed.

The frame synchronizer looks for the frame sync pattern in the sequence of data bits coming out of detector 305 to find the first frame sync in the received packet. The frame synchronizer is preferably implemented in DSP 214.

After the frame sync is found, the data bits after the frame sync are sent to host 215. For a packet that contains multiple frame sync patterns and data frames, the frame sync pattern after the first one can be found by host 215. In this case, DSP 214 processes the information after the frame sync pattern, which includes both frame sync patterns and data frames, as the data and passes it to the host 215.

Generally, the frame synchronization algorithm processes a reference frame sync vector, $V_{REF}$, and a received frame sync vector, $V_{RCV}$, both having the same length, $L_V$. The reference frame sync vector carries the frame sync pattern. The frame sync received vector carries the detected bits from detector 305. The length of the reference and received frame sync vectors is at least that of the frame sync pattern, $L_{SYNC}$ (i.e., $L_V \leq L_{SYNC}$). The rightmost bit in the vector is the LSB. Another vector used in the frame synchronization procedure is a frame sync mask. The frame sync mask is of the length $L_V$ with the rightmost $L_{SYNC}$ bits set to ones.

The frame synchronization algorithm also includes a sync allowed threshold, which is configurable. The sync allowed threshold specifies the number of bit errors allowed to occur in the comparison between the reference vector, $V_{REF}$, and the received vector, $V_{RCV}$.

In the FRAME SYNC state (FIGS. 4 and 5), every detected bit is placed into the received frame sync vector. Then, the received frame sync vector is compared with the reference vector. The number of bit errors is counted. If the number of bit errors is less than the sync allowed threshold, then the frame sync is considered found.

Figure 12:
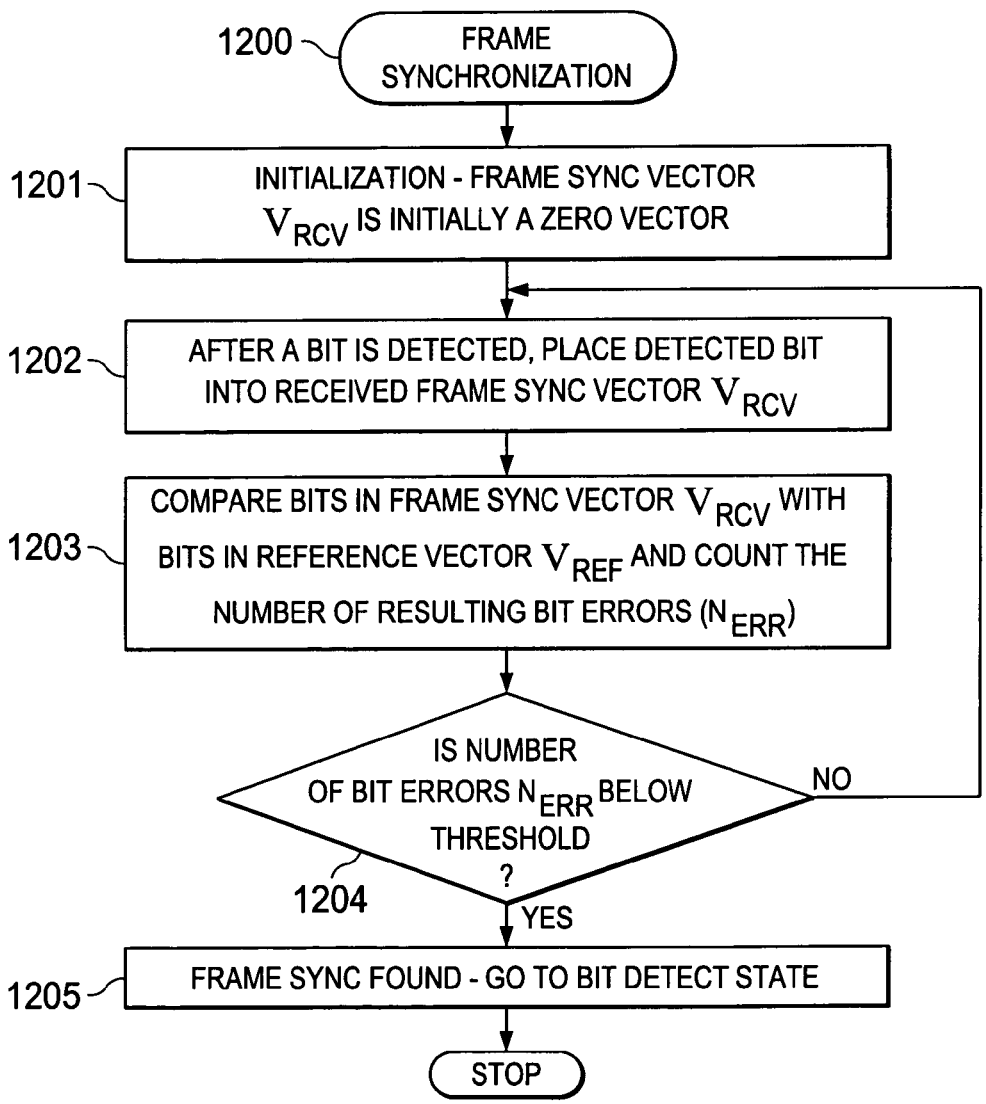
FIG. 12 is a flow chart of a preferred frame synchronization procedure.
Figure 13A:
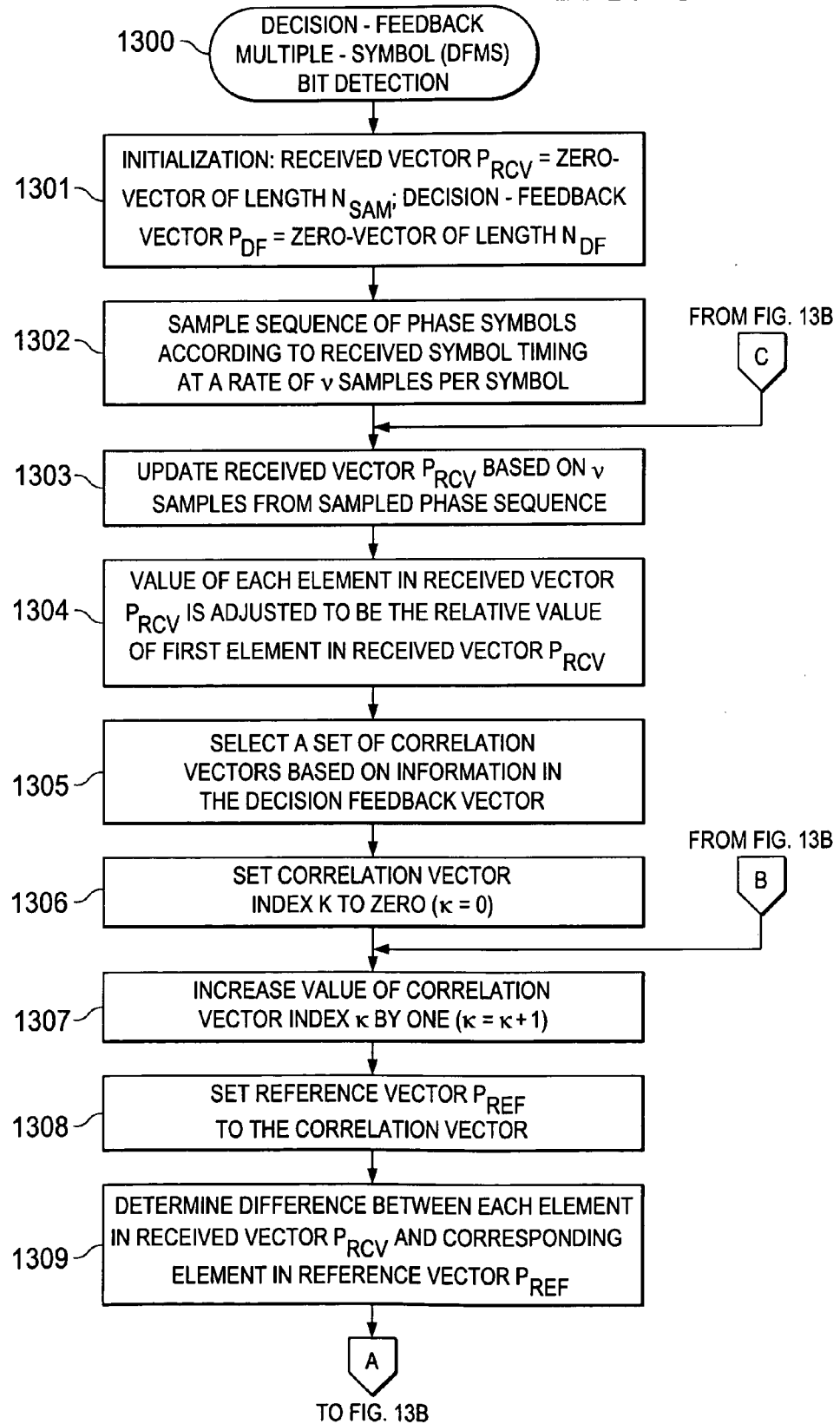
FIG. 13 is a flow chart of a preferred decision-feedback multiple-symbol (DFMS) symbol detection procedure.
Figure 13B:
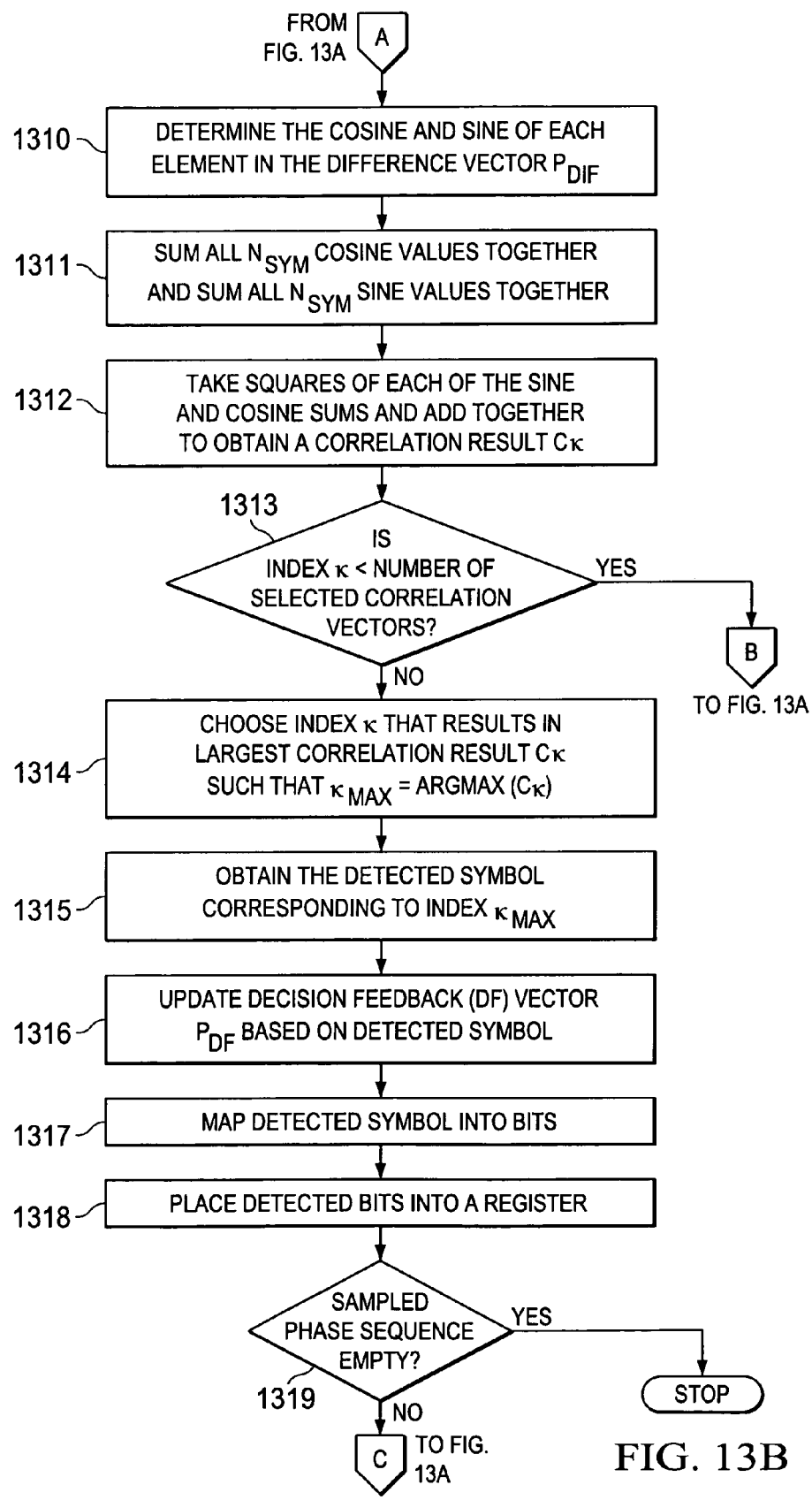

A preferred frame synchronization algorithm 1200, according to the illustrated embodiment of the inventive principles, is shown in FIG. 12.

Initialization takes place at Block 1201, with the received frame sync vector, $V_{RCV}$, initially being a zero-vector. At Block 1202, in the FRAME SYNC state, each detected bit is input to the received frame sync vector. Specifically, the bits in the vector $V_{RCV}$ are shifted left by one and the detected bit is placed at the rightmost position in the $V_{RCV}$ vector. The vector $V_{RCV}$ is ANDed with the frame sync mask.

Next, each bit in the received frame sync vector $V_{RCV}$ is compared with the corresponding bit in reference frame sync vector $V_{REF}$, and then the number of bit errors is counted (Block 1203). In particular, an Exclusive OR operation is performed between the received and reference frame sync vector, yielding an error vector as:

$$V_{ERR} = V_{RCV} \wedge V_{REF},$$

where $\wedge$ denotes an Exclusive OR operation, and $V_{ERR}$ is a vector of length $L_V$ bits, with 1 representing a bit error.

The number of bit errors in the error vector is counted as:

$$N_{ERR} = \sum_{l=0}^{L_V-1} V_{ERR}[l]$$

At Block 1204, a comparison is made of the number of bit errors $N_{ERR}$ with the sync allowed threshold. If $N_{ERR}$ is less than the sync allowed threshold, then frame synchronization is found, and the demodulator goes to BIT DETECT state (Block 1205). Otherwise, processing returns to Block 1202 and the operations at Blocks 1202-1204 are repeated until the all detected bits in the received block are processed.

Detector 305 uses a decision-feedback multiple-symbol (DFMS) detection algorithm that is applicable to both the constant envelope modulations and linear modulations. DFMS detection is robust to inter-symbol interference as well as fading while having low implementation complexity.

The fundamental concept of the DFMS detector is to detect a symbol based on an observation of multiple symbols, including symbols transmitted before and after the detected symbol, along with information of past detected symbols. This is achieved by correlating a sequence of received signal samples with a selected set of correlation filters. The filter coefficients are stored in a memory, which could be an on chip memory or an SDRAM. After the correlation results are obtained, the filter that results in the largest correlation results is chosen, and the corresponding detected symbol is obtained. The detected symbol is mapped into bits and stored in a register. The detected symbol is also stored in a buffer to be used for the detection of the next symbols.

The DFMS detector comprises two key components, multi-symbol (MS) detection and decision feedback (DF). The multi-symbol detection component processes a window of $N_{SYM}$ symbols to obtain a detected symbol. The decision feedback component takes $N_{DF}$ past detected symbols to select the correlation vectors for the multi-symbol detection process. The length of multi-symbol observation window, $N_{SYM}$, and the length of decision feedback symbols, $N_{DF}$, are configurable. The DFMS detector is associated with multi-symbol vectors, including received vector ($P_{RCV}$), reference vector ($P_{REF}$)), a decision feedback vector ($P_{DF}$), and a set of correlation vectors, $\{Q_k\}$, k=0, 1, ..., $N_Q$−1 that includes $N_Q$ possible sequences of transmitted samples. The set of correlation vectors can include all possible sequences or only part of them.

In the illustrated embodiment of SDR 200, the feedback vector, which indicates the start position of the selected subset in the correlation set, is processed as follows. First, the current feedback vector is converted to a decimal number, which is then multiplied by the size of subset, S (in the preferred embodiment, every subset has the same size, S). The resulting product is the start position of the selected subset in the correlation set. The S vectors in the correlation set from the start position k (e.g. vectors in positions k, k+1, ..., k+S−1) form the current subset, which provides the reference vectors in the comparison operations described immediately above.

For example, for a multi-symbol detector with 3-symbol observation window and 1-symbol feedback, the set of all possible correlation vectors can be constructed from the sequences: {000, 001, 010, 011, 100, 101, 110, and 111}. Hence, if the feedback symbol is 0, the detector chooses the subset of correlation vectors that are constructed from the sequences {000, 001, 010, 011}, i.e. sequences where the first symbol is 0. If the feedback symbol is 1, the detector chooses the subset of correlation vectors that are constructed from the sequences {100, 101, 110, 111}. Following the steps above, with the size of subset being S=4, the subset starts from position 0 when the feedback symbol is 0 and starts from position 1×4=4 when the feedback symbol is 1.

The DFMS detection algorithm can be implemented in FPGA 208 or DSP 214. The DFMS detector takes a sequence of phase samples, performs DFMS detection, and outputs the detected bits to a data register. A flow chart block of a preferred DFMS detector algorithm 1300 is provided as FIG. 12.

Initialization is performed at Block 1301, where the received vector, $P_{RCV}$, is initially a zero-vector of length $N_{SYM}$ and the decision feedback vector, $P_{DF}$, is initially a zero-vector of length $N_{DF}$. At Block 1302, after the symbol timing is obtained from the BIT SYNC state, the sequence of phase samples from the given CORDIC rotator 229 is sampled according to the obtained symbol timing at the rate of v samples per symbol.

The received vector $P_{RCV}$ for the MSDF detector is updated at Block 1303 based on the v samples obtained from the sampled phase sequence. Specifically, the received vector carries the oldest to the newest detected samples from the left to the right. This can be done by removing the u leftmost samples from the received vector, shifting the samples in the received vector to the left by v positions, and then placing the new v samples in the v rightmost positions.

At Block 1304, the value of each element in the received vector $P_{RCV}$ is adjusted to be the relative value of the first element in the received vector.

A set of correlation vectors based on information in the decision feedback vector is selected at Block 1305. At Block 1306, the index of the correlation vectors, k, is set to zero, i.e., k=0. Then, for the current iteration, the value of k is increased by one, i.e., k=k+1, at Block 1307.

At Block 1308, the reference vector, $P_{REF}$, is set to the correlation vector. Then, at Block 1309, the difference between each element in the received vector, $P_{RCV}$, and that in the reference vector, $P_{REF}$, is determined. In particular, this determination is made as:

$$P_{DIF}(n) = P_{RCV}(n) - P_{REF}(n)$$

for n=1, 2, ..., $N_{SYM}$.

At Block 1310, the cosine and sine of each element in the vector $P_{DIF}$ are determined, for example, using CORDIC rotator 229 or a look-up table (LUT) in DSP 214. All $N_{SYM}$ cosine values are summed together, all $N_{SAM}$ sine values are summed together at Block 1311.

At Block 1312, the squares of both the sum cosine result and the sum sine result are taken, and then added together, which yields the correlation result $C_k$. If at Block 1313, the index k is less than the number of selected correlation vectors, then algorithm 1300 returns to Block 1307. Otherwise, algorithm 1300 continues to Block 1314, where the index k that results in the largest correlation result $C_k$ is chosen, i.e., to obtain $$k_{max} = \text{argmax}(C_k)$$

At Block 1315, the detected symbol corresponding to the index $k_{max}$ is obtained, and at Block 1316, the decision feedback (DF) vector, $P_{DF}$, is updated based on the detected symbol. Specifically, the DF vector is allowed carry the oldest to the newest detected symbols from the left to the right by removing the leftmost element from the DF vector, shifting the elements in the DF vector to the left by one position, and then placing the detected symbol in the rightmost position.

At Block 1317, the detected symbol is mapped into bits, as was done in the transmit side, and at Block 1318, the detected bits are placed into a register. The register is the sync register when the demodulator is in the FRAME SYNC state, and it is the data register when the demodulator is in the BIT DETECT state.

At Block 1319, a check is made as to whether the sampled phase sequence is empty. If so, the demodulator process for this received block is finished, otherwise, algorithm 1300 returns to Block 1303.

Advantageously, as the operations required in the DFMS detector are mostly addition and table look-up, the DFMS detector achieves low implementation complexity.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method for synchronizing processing of a data packet received by a radio receiver from a radio transmitter comprising:
   generating a reference sample sequence comprising:
   sampling and modulating synchronization symbols of a selected reference synchronization pattern using a selected modulation technique;

generating a reference phase-information sample sequence from a resulting modulated reference sample sequence; and low-pass filtering the reference phase-information sample sequence to generate the reference sample sequence;

receiving with the radio receiver a data packet;

sampling and modulating symbols within the received data packet with the selected modulation technique;

generating a received phase-information sample sequence from a resulting modulated received sample sequence;

low-pass filtering the received phase information sample sequence;

sequentially entering samples of the filtered received phase-information sample sequence into a vector;

as each sample is entered, incrementing a sample index;

as each sample is entered, comparing current samples in the vector with corresponding samples of the reference sample sequence, adjusting for frequency offset;

establishing bit synchronization when the current samples in the vector and at least some of the samples in reference sample sequence match; and taking a current value of sample index as representing the symbol timing.

2. The method of claim 1, further comprising:

averaging the samples of the reference sample sequence to obtain a DC gain of the reference sequence; and calculating the frequency offset by averaging the filtered received phase-information sample sequence and adjusting by the DC gain of the reference sequence.

3. The method of claim 1, wherein comparing current low-pass filtered received phase-information samples in the vector with corresponding samples of the reference sample sequence, adjusting for frequency offset, until a match is found comprises:

taking a difference between each sample in the vector with the corresponding sample of the reference sample sequence;

adding the frequency offset to the resulting difference;

taking the absolute value after adding the frequency offset;

summing the absolute values taken for all the samples in the vector; and comparing the sum against a pre-selected threshold to detect a match.

4. The method of claim 1, wherein modulating synchronization symbols of a selected synchronization pattern using a selected modulation technique comprises modulating the synchronization symbols using a modulation technique selected from the group of modulation techniques consisting of Differential Quadrature Phase Shift Keying, $\pi/4$ Differential Quadrature Phase Shift Keying, 4-Level frequency Modulation, Shaped-Offset Quadrature Phase Shift Keying, Gaussian Minimum Shift Keying, and Gaussian Frequency Shift Keying.

5. The method of claim 1, where in low-pass filtering the reference phase-information sample sequence comprises low-pass filtering with a boxcar filter.

6. The method of claim 1, wherein modulating synchronization symbols of a selected synchronization pattern comprises modulating a bit synchronization pattern.

7. The method of claim 1, wherein modulating synchronization symbols of a selected synchronization pattern comprises modulating a frame synchronization pattern.

8. The method of claim 1, wherein the reference phase-information sample sequence and the received phase-information sample sequence are comprised of phase-difference samples.

9. The method of claim 1, further comprising filtering the modulated reference sample sequence with a pre-detection filter prior to generating a reference phase-information sample sequence.

10. A radio receiver comprising:

a memory storing a reference sample sequence; and a synchronizer operable to:

receive a data packet;

sample and modulate symbols from the data packet to generate modulated samples;

generate phase-information samples from the modulated samples;

low-pass filter the phase-information samples to generate a filtered phase-information sample sequence;

selectively compare samples of the filtered phase-information sample sequence with samples of the reference sample sequence; and establish bit synchronization when a selected number of samples of the filtered phase-information sample sequence match a selected number of samples of the reference sample sequence.

11. The radio receiver of claim 10, wherein the stored reference sample sequence is derived from a reference synchronization pattern by:

sampling and modulating synchronization symbols from the reference synchronization pattern;

generating reference phase-information samples from resulting modulated reference samples; and low-pass filtering resulting reference phase-information samples to generate the reference sample sequence.

12. The radio receiver of claim 10, wherein the synchronizer is implemented at least in part by a digital signal processor.

13. The radio receiver of claim 10, wherein the synchronizer is implemented at least in part by a field programmable gate array.

14. The radio receiver of claim 11, wherein the symbols from the data packet and the symbols from the reference synchronization pattern are modulated using a modulation technique selected from the group of modulation techniques consisting of Differential Quadrature Phase Shift Keying, $\pi/4$ Differential Quadrature Phase Shift Keying, 4-Level frequency Modulation, Shaped-Offset Quadrature Phase Shift Keying, Gaussian Minimum Shift Keying, and Gaussian Frequency Shift Keying.

15. The radio receiver of claim 10, wherein the synchronizer is operable to low-pass filter the phase-information samples with a boxcar filter.

16. A method of symbol detection in a radio receiver, comprising:

updating a received vector with a received sequence of data samples;

setting the elements of the received vector to the first sample in the received sequence of data samples;

selecting a set of correlation vectors in response to a feedback vector, each correlation vector corresponding to a symbol;

comparing the received vector with each correlation vector in the selected set of correlation vectors to generate a set of correlation values, comprising:

calculating a difference between each symbol in the received vector with a corresponding symbol in a current correlation vector;

calculating a sine value and a cosine value for each resulting difference value:

summing the sine values together;

summing the cosine values together; and calculating squares of each of the resulting sum of the sine values and the resulting sum of the cosine values to obtain a correlation value for the comparison between the received vector and the current correlation vector; and taking the symbol corresponding the correlation vector with the highest correlation value as the detected symbol.

17. The method of claim 16, further comprising generating the set of correlation vectors comprising:
selecting a number of samples defining a window;
for each combination of symbols within the window, generating a vector;
sampling and modulating each vector to generate a set of modulated sampled vectors;
filtering the modulated sampled vectors using transmit and receive filters; and
storing the filtered modulated sampled vectors as the set of correlation vectors.

18. A method of symbol detection in a radio receiver, comprising:
updating a received vector with a received sequence of data samples;
setting the elements of the received vector to the first sample in the received sequence of data samples;
selecting a set of correlation vectors in response to a feedback vector, each correlation vector corresponding to a symbol comprising pointing to the selected set of correlation vectors within a larger set of correlation vectors with a product of a numerical value representing the symbols in the feedback vector with a number of correlation vectors in the set;
comparing the received vector with each correlation vector in the selected set of correlation vectors to generate a set of correlation values;
taking the symbol corresponding to the correlation vector with the highest correlation value as the detected symbol; and
updating the feedback vector by entering the detected symbol into a newest symbol position in the feedback vector and shifting at least one previously entered detected symbol into an older symbol position in the feedback vector.

19. A radio receiver comprising
a decision feedback multiple symbol detector operable to:
update a received vector with a received sequence of data samples;
set the elements of the received vector to the first sample in the received sequence of data samples;
select a set of correlation vectors in response to a feedback vector, each correlation vector corresponding to a symbol;
compare the received vector with each correlation vector in the selected set of correlation vectors to generate a set of correlation values by:
calculating a difference between each symbol in the received vector with a corresponding symbol in a current correlation vector;
calculating a sine value and a cosine value for each resulting difference value:
summing the sine values together;
summing the cosine values together; and
calculating squares of each of the resulting sum of the sine values and the resulting sum of the cosine values to obtain a correlation value for the comparison between the received vector and the current correlation vector; and take the symbol corresponding the correlation vector with the highest correlation value as the detected symbol.

20. The radio receiver of claim 19, wherein the decision feedback multiple symbol detector is implemented at least in part with a digital signal processor.

21. The radio receiver of claim 19, wherein the decision feedback multiple symbol detector is implemented at least in part with a field programmable gate array.

22. The radio receiver of claim 19, wherein the decision feedback multiple symbol detector updates the feedback vector by entering the detected symbol into a newest symbol position in the feedback vector and shifting at least one previously entered detected symbol into an older symbol position in the feedback vector.

23. The radio receiver of claim 19, wherein the decision feedback multiple symbol detector selects a set of correlation vectors in response to a feedback vector by pointing to the selected set of correlation vectors within a larger set of correlation vectors with a product of a numerical value representing the symbols in the feedback vector with a number of correlation vectors in the set.

24. A radio comprising:
a synchronizer for:
receiving a data packet;
generating a sequence of received samples from symbols in the data packet;
selectively comparing samples of the sequence of received samples with samples of a sequence of reference samples; and
establishing bit synchronization when a selected number of samples of the sequence of received samples match a selected number of samples of the sequence of reference samples; and
a decision feedback multiple symbol detector for:
updating a received vector with a received sequence of data samples;
setting the elements of the received vector to the first sample in the received sequence of data samples;
selecting a set of correlation vectors in response to a feedback vector, each correlation vector corresponding to a symbol;
comparing the received vector with each correlation vector in the selected set of correlation vectors to generate a set of correlation values; and
taking the symbol corresponding the correlation vector with the highest correlation value as the detected symbol.

25. The radio of claim 24, wherein generating a sequence of received samples from symbols in the data packet comprises:
sampling and modulating symbols from the data packet to generate modulated samples;
generating phase-information samples from the modulated samples; and
low-pass filtering the phase-information samples to generate the sequence of received samples.

26. The radio of claim 24, wherein the decision feedback multiple symbol detector compares the received vector with each correlation vector in the selected set of correlation vectors to generate a set of correlation values by:
calculating a difference between each symbol in the received vector with a corresponding symbol in a current correlation vector;
calculating a sine value and a cosine value for each resulting difference value;
summing the sine values together;
summing the cosine values together; and calculating squares of each of the resulting sum of the sine values and the resulting sum of the cosine values to obtain a correlation value for the comparison between the received vector and the current correlation vector.

27. The radio of claim 24, wherein the radio comprises a software defined radio.

28. The radio of claim 24, further comprising:
a plurality of subsystems each for processing a data channel of a selected frequency and a selected modulation type; and
wherein the synchronizer and the decision feedback multiple symbol detector operate sequentially on blocks of data received from the plurality of subsystems, one data block from each data channel at a time.

29. The radio of claim 28, wherein each of the plurality of subsystems comprises a direct data converter operable to:
perform frequency mixing on the corresponding data channel;
perform automatic gain control on the corresponding data channel;
perform pre-detection filtering on the data channel; and
perform CORDIC rotation and phase differentiation on the corresponding data channel.

30. A method of performing demodulation on received data in a radio comprising:
performing bit synchronization to detect a preamble of a packet of received data and determine a best symbol timing, comprising:
sampling and modulating symbols from the data packet to generate modulated samples;
generating phase-information samples from the modulated samples;
low-pass filtering the phase-information samples to generate a filtered phase-information sample sequence;
selectively comparing samples of the filtered phase-information sample sequence with samples of the reference sample sequence; and
establishing bit synchronization when a selected number of samples of the filtered phase-information sample sequence match a selected number of samples of the reference sample sequence;
performing frame synchronization utilizing the best symbol timing to determine a start of a data frame within the packet of data; and
performing multiple-symbol decision feedback detection to detect bits from the data packet, a selected number of detected bits being utilized for performing the frame synchronization.

31. A method of performing demodulation on received data in a radio comprising:
performing bit synchronization to detect a preamble of a packet of received data and determine a best symbol timing;
performing frame synchronization utilizing the best symbol timing to determine a start of a data frame within the packet of data; and
performing multiple-symbol decision feedback detection to detect bits from the data packet, a selected number of detected bits being utilized for performing the frame synchronization comprising:
updating a received vector with a sequence of data samples from the data packet;
setting the elements of the received vector to the first sample in the received sequence of data samples;
selecting a set of correlation vectors in response to a feedback vector, each correlation vector corresponding to a symbol;
comparing the received vector with each correlation vector in the selected set of correlation vectors to generate a set of correlation values;
taking the symbol corresponding the correlation vector with the highest correlation value as the detected symbol; and
converting the detected symbol into bits.

* * * * *